US012700935B2

(12) United States Patent
Lee

(10) Patent No.: US 12,700,935 B2
(45) Date of Patent: Aug. 4, 2026

(54) METHODS AND APPARATUS TO CREDIT MEDIA BASED ON PRESENTATION RATE

(71) Applicant: The Nielsen Company (US), LLC, New York, NY (US)

(72) Inventor: Morris Lee, Palm Harbor, FL (US)

(73) Assignee: The Nielsen Company (US), LLC, New York, NY (US)

( * ) Notice: Subject to any disclaimer, the term of this patent is extended or adjusted under 35 U.S.C. 154(b) by 54 days.

(21) Appl. No.: 18/391,696

(22) Filed: Dec. 21, 2023

(65) Prior Publication Data

US 2024/0283553 A1 Aug. 22, 2024

Related U.S. Application Data

(63) Continuation of application No. 17/565,359, filed on Dec. 29, 2021, now Pat. No. 11,894,915.

(60) Provisional application No. 63/189,577, filed on May 17, 2021.

(51) Int. Cl.
| | |
|---|---|
| *H04N 21/218* | (2011.01) |
| *H04H 60/37* | (2008.01) |
| *H04H 60/45* | (2008.01) |
| *H04H 60/58* | (2008.01) |
| *H04N 21/2343* | (2011.01) |
| *H04N 21/2365* | (2011.01) |
| *H04N 21/2387* | (2011.01) |
| *H04N 21/442* | (2011.01) |
| *H04N 21/6373* | (2011.01) |
| *H04N 21/647* | (2011.01) |

(52) U.S. Cl.
CPC .......... *H04H 60/58* (2013.01); *H04H 60/372* (2013.01); *H04H 60/45* (2013.01); *H04N 21/44222* (2013.01)

(58) Field of Classification Search
None
See application file for complete search history.

(56) References Cited

U.S. PATENT DOCUMENTS

| | | | | |
|---|---|---|---|---|
| 11,652,759 B1 * | 5/2023 | Cheon | .................. | H04W 48/08 |
| | | | | 370/328 |
| 2006/0184961 A1 * | 8/2006 | Lee | .................. | H04N 21/23418 |
| | | | | 725/32 |
| 2008/0148309 A1 * | 6/2008 | Wilcox | ................. | H04H 60/22 |
| | | | | 725/14 |

(Continued)

*Primary Examiner* — Brian T Pendleton
*Assistant Examiner* — Jean D Saint Cyr

(57) ABSTRACT

Methods, apparatus, systems and articles of manufacture are disclosed to credit media based on the presentation rate. An example apparatus disclosed herein includes memory and instructions. The example apparatus disclosed herein further includes at least one processor to execute the instructions to cause the at least one processor to at least detect a first peak in a first frequency range of audio data associated with monitored media, detect a second peak in a second frequency range of the audio data, the second frequency range different from the first frequency range, detect that a presentation rate of the monitored media is increased relative to a reference version of the media in response to the second peak being greater than the first peak, generate a signature corresponding to the monitored media, and transmit the signature to a media monitoring entity to credit the monitored media based on the presentation rate.

20 Claims, 17 Drawing Sheets

100 —

(56)     References Cited

U.S. PATENT DOCUMENTS

2013/0312019 A1\*  11/2013  McMillan  ........ H04N 21/42203
                                                                    725/14
2018/0124533 A1\*   5/2018  Messier  ................ G10L 19/018

\* cited by examiner

1000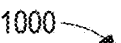

```
                    ┌─────────┐
                    │  START  │
                    └─────────┘
                         │
                         ▼
┌───────────────────────────────────────────────────┐
│              OBTAIN AUDIO DATA                      │──── 1002
└───────────────────────────────────────────────────┘
                         │
                         ▼
┌───────────────────────────────────────────────────┐
│      GENERATE FREQUENCY SPECTRUM OF AUDIO DATA      │──── 1004
└───────────────────────────────────────────────────┘
                         │
                         ▼
┌───────────────────────────────────────────────────┐
│      IDENTIFY FIRST PEAK IN FIRST FREQUENCY RANGE   │──── 1006
└───────────────────────────────────────────────────┘
                         │
                         ▼
┌───────────────────────────────────────────────────┐
│    IDENTIFY SECOND PEAK IN SECOND FREQUENCY RANGE   │──── 1008
└───────────────────────────────────────────────────┘
                         │
                         ▼
┌───────────────────────────────────────────────────┐
│              GENERATE SIGNATURES                    │──── 1010
└───────────────────────────────────────────────────┘
                         │
                         ▼
┌───────────────────────────────────────────────────┐
│  TRANSMIT FREQUENCY SPECTURM AND SIGNATURES TO      │──── 1012
│              CENTRAL OFFICE                         │
└───────────────────────────────────────────────────┘
                         │
                         ▼
                    ┌─────────┐
                    │   END   │
                    └─────────┘
```

FIG. 10

METHODS AND APPARATUS TO CREDIT MEDIA BASED ON PRESENTATION RATE

CROSS-REFERNCE TO RELATED APPLICATIONS

This disclosure is a continuation of U.S. Nonprovisional patent application Ser. No. 17/565,359, which was filed on Dec. 29, 2021, now U.S. Pat. No. 11,894,915, which claims the benefit of U.S. Provisional Patent Application No. 63/189,577, which was filed on May 17, 2021. U.S. Non-provisional patent application Ser. No. 17/565,359 and U.S. Provisional Patent Application No. 63/189,577 are hereby incorporated herein by reference in their entirety. Priority to U.S. Nonprovisional patent application Ser. No. 17/565,359 and U.S. Provisional Patent Application No. 63/189,577 is hereby claimed.

FIELD OF THE DISCLOSURE

This disclosure relates generally to media identification systems, and, more particularly, to methods and apparatus to credit media based on presentation rate.

BACKGROUND

A media monitoring entity can generate audio signatures from a media signal. Audio signatures are a condensed reference that can be used to subsequently identify the media. These signatures can be hashed to allow faster matching in an audio signature database. In some examples, a media monitoring entity can monitor a media source feed (e.g., a television feed, etc.) to generate reference signatures representative of media presented via that media source feed. Such reference signatures can be compared to signatures generated by media monitors to credit viewership of the media.

BRIEF DESCRIPTION OF THE DRAWINGS

FIG. 10 is a flowchart representative of example machine readable instructions which may be executed to implement the meter of FIGS. 1 and/or 4.

The figures are not to scale. In general, the same reference numbers will be used throughout the drawing(s) and accompanying written description to refer to the same or like parts.

Figure 1:
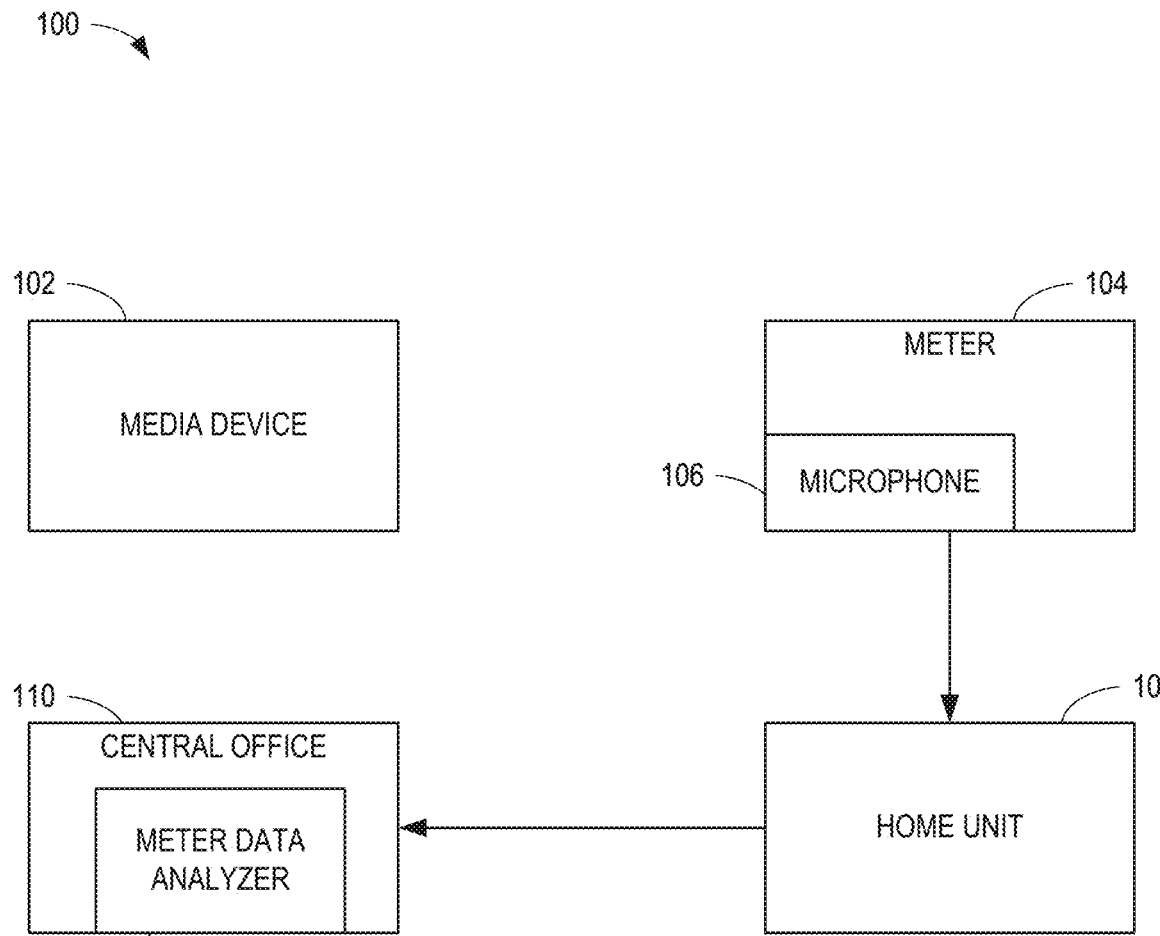
FIG. 1 is a block diagram of an example environment in which the teachings of this disclosure may be implemented.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

As used herein, the term "media" includes any type of content and/or advertisement delivered via any type of distribution medium. Thus, media includes television programming or advertisements, radio programming or advertisements, podcasts, movies, web sites, streaming media, etc.

Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc.

In some examples, media monitoring information is aggregated to determine ownership and/or usage statistics of media devices, determine the media presented by the media devices, determine audience ratings, determine relative rankings of usage and/or ownership of media devices, determine types of uses of media devices (e.g., whether a device is used for browsing the Internet, streaming media from the Internet, etc.), and/or determine other types of media device information. In examples disclosed herein, monitoring information includes, but is not limited to, one or more of media identifying information (e.g., media-identifying metadata, codes, signatures, watermarks, and/or other information that may be used to identify presented media), application usage information (e.g., an identifier of an application, a time and/or duration of use of the application, a rating of the application, etc.), identifying information (e.g., demographic information, a user identifier, a panelist identifier, a username, etc.), etc.

Audio watermarking is a technique used to identify media, such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the watermark is embedded in the audio or video component so that the watermark is hidden. This embedding may be carried out utilizing psychoacoustic masking.

As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header).

To identify watermarked media, the watermark(s) are extracted and used to access a table of reference watermarks that are mapped to media identifying information. In some examples, media monitoring companies provide watermarks and/or watermarking devices to media providers with which to encode their media source feeds. In some examples, if a media provider provides multiple media source feeds (e.g., ESPN and ESPN 2, etc.), a media provider can provide a different watermark for each media source feed. In some examples, a media provider could encode a media source feed with an incorrect watermark (e.g., a watermark meant for ESPN could accidentally be encoded on ESPN2, etc.). In this example, crediting using only watermarking could result in the wrong media source feed being credited.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a time interval. A good signature is repeatable when processing the same media presentation, but is unique relative to other (e.g., different) presentations of other (e.g., different) media. Accordingly, the terms "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more reference signatures corresponding to known (e.g., reference) media source feeds. Various comparison criteria, such as a cross-correlation value, a Hamming distance, etc., can be evaluated to determine whether a monitored signature matches a particular reference signature. When a match between the monitored signature and a reference signatures is found, the monitored media can be identified as corresponding to the particular reference media represented by the reference signature that matched the monitored signature. In some examples, signature matching is based on sequences of signatures such that, when a match between a sequence of monitored signatures and a sequence of reference signatures is found, the monitored media can be identified as corresponding to the particular reference media represented by the sequence of reference signatures that matched the sequence of monitored signatures. Because attributes, such as an identifier of the media, a presentation time, a broadcast channel, etc., are collected for the reference signature, these attributes may then be associated with the monitored media whose monitored signature(s) matched the reference signature(s). Example systems for identifying media based on codes and/or signatures are long known and were first disclosed in Thomas, U.S. Pat. No. 5,481,294, which is hereby incorporated by reference in its entirety.

Media monitoring entities (e.g., The Nielsen Company (US), LLC, etc.) desire knowledge regarding how users interact with media devices such as smartphones, tablets, laptops, smart televisions, etc. In particular, media monitoring entities want to monitor media presentations made at the media devices to, among other things, monitor exposure to advertisements, determine advertisement effectiveness, determine user behavior, identify purchasing behavior associated with various demographics, etc. Media monitoring entities can provide media meters to people (e.g., panelists) which can generate media monitoring data based on the media exposure of those users. Such media meters can be associated with a specific media device (e.g., a television, a mobile phone, a computer, etc.) and/or a specific person (e.g., a portable meter, etc.).

Media monitoring entities can generate media reference databases that can include unhashed signatures, hashed signatures, and watermarks. These references are generated by a media monitoring entity (e.g., at a media monitoring station (MMS), etc.) by monitoring a media source feed, identifying any encoded watermarks and determining signatures associated with the media source feed. In some examples, the media monitoring entity can hash the determined signatures. Additionally or alternatively, the media monitoring entities generate reference signatures for downloaded reference media (e.g., from a streaming media provider), reference media transmitted to the media monitoring entity from one or more media providers, etc. That is, the media monitoring entities can generate reference signatures of media that is not live broadcasted. In some examples, media that is not live broadcasted includes a subscription video on demand (SVOD) asset. As used herein, a "media asset" refers to any individual, collection, or portion/piece of media of interest (e.g., a commercial, a song, a movie, an episode of television show, etc.). Media assets can be identified via unique media identifiers (e.g., a name of the media asset, a metadata tag, etc.). Media assets can be presented by any type of media presentation method (e.g., via streaming, via live broadcast, from a physical medium, etc.).

The reference database can be compared (e.g., matched, etc.) to media monitoring data (e.g., watermarks, unhashed signatures, hashed signatures, etc.) gathered by media meter(s) to allow crediting of media exposure. Monitored media can be credited using one, or a combination, of watermarks, unhashed signatures, and hashed signatures. If the presentation rate of a media asset is different from the original presentation rate (e.g., sped up, slowed down), the monitored signatures may not match the corresponding reference signatures of the media asset and, thus, generate a false negative. As used herein, a "presentation rate" refers to the speed of the media being presented. For example, a television show can be sped up by 4.3% with respect to the original presentation rate. Speeding up and/or slowing down a presentation rate may be beneficial for having a media asset be presented in a desired amount of time. For example, if a media asset were twenty one minutes in length, but a desired amount of time was twenty minutes, the media presentation rate may be increased (e.g., sped up) to accommodate the desired twenty minute presentation time, as opposed to removing and/or not presenting one minute of the media. In some examples, such altering of the presentation rate of the media may be a result of a media presentation entity (e.g., a streaming service). In other examples, such an alteration of the presentation rate may be at the request of a user.

As noted above, an adjusted presentation rate may result in false negative identifications of a media asset. As used herein, a "false negative" refers to incorrectly not crediting a media exposure to a reference media asset that was actually being presented to the panelist. To prevent incorrect crediting caused by changes to the presentation rate of media assets, methods, apparatus, and systems disclosed herein credit media assets based on the presentation rate.

Although examples disclosed herein include determining whether the presentation rate of a media asset is sped up with respect to the original presentation rate, examples disclosed herein are not limited thereto. For example, the presentation rate of the media asset can be slowed down with respect to the original presentation rate.

In some examples, media monitoring entities store generated reference databases and gathered monitoring data on cloud storage services (e.g., AMAZON WEB SERVICES®, etc.). To allow the crediting of time-shifted viewing (e.g., viewing media via a digital video recorder (DVR), etc.), the stored references are retained for a period time after the initial presentation of the media.

Methods and apparatus disclosed herein enable crediting media based on the presentation rate. Example techniques disclosed herein include generating a frequency spectrum of the audio data corresponding to the monitored media. Disclosed example techniques also include identifying a first peak in a first frequency range and a second peak in a second frequency range. Disclosed example techniques further include determining the presentation rate of the media asset is greater than the original presentation rate in response to the second peak being greater than the first peak. Disclosed example techniques also include determining the presentation rate of the media asset is the original presentation rate in response to the first peak being greater than the second peak. Disclosed example techniques also include crediting the monitored media presentation to a reference media asset based on the determination of the presentation rate.

FIG. 1 is a block diagram of an example environment 100 in which the teachings of this disclosure may be implemented. The example environment 100 includes an example media device 102, an example meter 104, an example home unit 108, and an example central office 110. In the illustrated example of FIG. 1, the media device 102 receives media from a media source (e.g., a cable media service provider, an Internet based provider, etc.), and presents the media. The example meter 104 collects media monitoring information from the presented media. For example, the meter 104 includes an example microphone 106 to collect audio data. In some examples, the meter 104 is associated with (e.g., installed on, coupled to, etc.) a respective media device. For example, the media device 102 associated with the meter 104 presents media (e.g., via a display, etc.). In some examples, the media device 102 associated with meter 104 additionally or alternatively presents the media on separate media presentation equipment (e.g., speakers, a display, etc.). For example, the media device 102 associated with meter 104 can include a personal computer, an Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), televisions, desktop computers, laptop computers, servers, etc. In such examples, the meter 104 may have a direct connection (e.g., a physical connection) to the devices to be monitored (e.g., the media device 102), and/or may be connected wirelessly (e.g., via Wi-Fi, via Bluetooth, etc.) to the devices to be monitored.

Additionally or alternatively, in some examples, the meter 104 is a portable meter carried by one or more individual people (e.g., panelists). In the illustrated example, the meter 104 monitors media presented to one or more people associated with the meter 104 and generates monitoring data. In examples disclosed herein, the meter 104 generates a frequency spectrum of the monitoring data (e.g., audio data, etc.) and detects one or more peaks in one or more frequency ranges. In some examples, the meter 104 determines the presentation rate of the monitoring data based on the peaks.

In some examples, monitoring data generated by the meter 104 can include watermarks detected in presented media. Such detected watermarks may be referred to as monitored media watermarks or monitored watermarks as they are detected in media monitored by the meter 104. In some examples, the meter 104 can determine signatures associated with the presented media. For example, the meter 104 determines signatures (e.g., generates signatures, creates signatures, etc.) representative of media presented on the media device 102. Such signatures may be referred to as monitored media signatures or monitored signatures as they are determined from media monitored by the meter 104. Accordingly, the monitoring data can include monitored media signatures and/or monitored media watermarks representative of the media monitored by the meter 104. In some examples, the monitoring data is associated with a discrete, measurement time period (e.g., five minutes, ten minutes, etc.). In such example, the monitoring data can include at sequences of monitored media signatures and/or sequences of monitored media watermarks associated media asset(s) (or portions thereof) presented by the media devices monitored by the meter 104. Example implementations of the meter 104 are described below in connection with FIGS. 2 and/or 4.

In some examples, the monitoring data varies with the presentation rate of the monitored media. That is, musical notes are associated with certain frequencies. For example, the musical note A4 is associated with a frequency of 440 Hz. In examples disclosed herein, the presentation rate changes the frequency of the musical notes. That is, in some examples, pitch is not preserved with changes to the presentation rate. For example, increasing the presentation rate of audio data relative to a reference version of the audio data shifts the frequencies of the musical notes.

The example microphone 106 receives ambient sound (e.g., free field audio) including audible media and/or audience sounds from the audience members in the vicinity of the meter 104. Additionally or alternatively, the example microphone 106 may be implemented by a line input connection. The line input connection may allow an external microphone to be used with the meter 104 and/or, in some examples, may enable the microphone 106 to be directly connected to an output of a media device 102 (e.g., an auxiliary output of a television, an auxiliary output of an audio/video receiver of a home entertainment system, etc.). In some examples, the meter 104 is positioned in a location such that the microphone 106 receives ambient audio produced by the media device 102 and/or other devices of the environment 100 (not illustrated) with sufficient quality to identify media presented by the media device 102 and/or other devices of the environment 100 (e.g., a surround sound speaker system).

The example home unit 108 coordinates monitoring data of the meter 104. For example, the environment 100 can include one or more media devices 102 and/or one or more meters 104. In such examples, the home unit 108 receives monitoring data (e.g., monitored media watermarks, monitored media signatures, presentation rate indicators, etc.) from the meters 104. The home unit 108 transmits the monitoring data to the central office 110. In some examples, the home unit 108 can be absent. In such examples, the meter 104 can be in direct communication with the meter data analyzer 112 of the central office 110. For example, if the meter data analyzer 112 is implemented via a cloud service, the meter 104 can directly upload the monitoring data to the cloud service.

The example central office 110 is an execution environment used to implement the example meter data analyzer 112. In some examples, the central office 110 is associated with a media monitoring entity. In some examples, the central office 110 can be a physical processing center (e.g., a central facility of the media monitoring entity, etc.). Additionally or alternatively, the central office 110 can be implemented via a cloud service (e.g., AWS®, etc.). In this example, the central office 110 can further store and process generated watermark and signature reference data.

The example meter data analyzer 112 processes the gathered media monitoring data to detect, identify, credit, etc., respective media assets and/or portions thereof (e.g., media segments) associated with the corresponding monitoring data. For example, the meter data analyzer obtains monitored signatures and/or presentation rate data. The meter data analyzer 112 determines the presentation rate of the monitored media based on the presentation rate data. The meter data analyzer 112 determines a signature matches between the monitored signatures and the reference signatures based on the presentation rate. For example, the meter data analyzer 112 can adjust the signature search algorithm, determine a reference database to use, etc. based on whether the presentation rate is flagged as sped up or original speed.

The meter data analyzer 112 credits the media assets associated with the monitoring data of the monitored signatures. For example, the meter data analyzer 112 can compare the monitoring data to generated reference data to determine what respective media is associated with the corresponding monitoring data. In some examples, the meter data analyzer 112 can hash the signatures included in the monitoring data. In some examples, the meter data analyzer 112 can identify the media by matching unhashed signatures and/or hashed signatures. The meter data analyzer 112 of the illustrated example also analyzes the monitoring data to determine if the media asset(s), and/or particular portion(s) (e.g., segment(s)) thereof, associated with the signature match is (are) to be credited. For example, the meter data analyzer 112 can compare monitored media signatures in the monitoring data to a library of generated reference signatures to determine the media asset(s) associated with the monitored media signatures. Example implementations of the meter data analyzer 112 are described below in connection with FIGS. 3 and/or 5.

Figure 2:
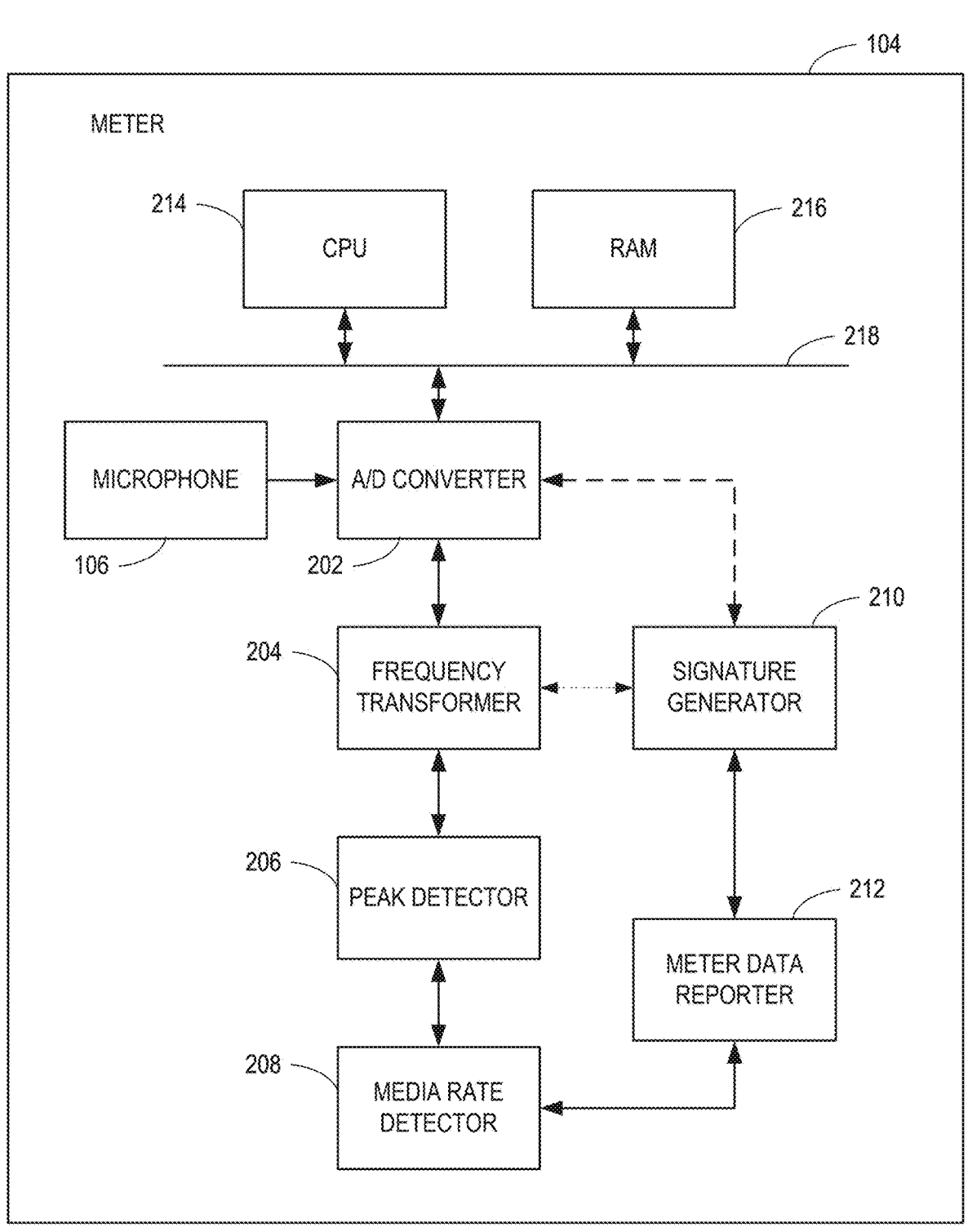
FIG. 2 is a block diagram of an example first implementation of a meter included in the example environment of FIG. 1.

FIG. 2 is a block diagram of an example first implementation of the meter 104 included in the example environment 100 of FIG. 1. In the illustrated example, the meter 104 includes the example microphone 106 (FIG. 1), an example analog-to-digital (A/D) converter 202, an example frequency transformer 204, an example peak detector 206, an example media rate detector 208, an example signature generator 210, an example meter data reporter 212, an example CPU 214, example RAM 216, and an example system bus 218.

The example microphone 106 records samples of audio data of the environment 100 and provides the audio data to the meter 104. For example, the A/D converter 202 obtains the audio data recorded by the microphone 106. The example A/D converter 202 converts the audio data into digital audio data.

The example frequency transformer 204 generates a frequency spectrum of the audio data, sometimes referred to herein as audio energy data. That is, the frequency transformer 204 computes a transform (e.g., a time-domain to frequency-domain transform) of the audio data. In some examples, the frequency transformer 204 implements means for transforming frequencies. In some examples, the frequency transformer 204 computes a frequency transform of a duration of the audio data. For example, the frequency transformer 204 generates a frequency spectrum of six seconds of the audio data. However, the frequency transformer 204 can generate a frequency spectrum of any suitable duration of the audio data (e.g., 30 seconds, one minute, etc.). In some examples, the frequency transformer 204 performs a Fourier transform on the audio data to determine the frequency spectrum. Example transforms computed by the frequency transformer 204 include, but are not limited to, a discrete Fourier transform (DFT), a sliding DFT, a modified discrete cosine transform (MDCT), a sliding MDCT, etc.

The example peak detector 206 detects peaks in the frequency spectrum of the audio data. In some examples, the peak detector 206 implements means for detecting peaks. For example, the peak detector 206 determines frequency ranges in the frequency spectrum and identifies peaks in the frequency ranges. For example, the peak detector 206 determines a first frequency range is approximately 440 Hz to 453 Hz and a second frequency range is approximately 454 Hz to 468 Hz. In some examples, the peak detector 206 determines additional frequency ranges (e.g., a third frequency range, a fourth frequency range, etc.). In examples disclosed herein, the peak detector 206 detects peaks in any suitable frequency range (e.g., 435 Hz to 450 Hz, etc.), and/or any size of frequency range (e.g., a 10 Hz range, a 5 Hz range, etc.). In examples disclosed herein, the peak detector 206 detects a peak in each frequency range. For example, the peak detector 206 detects a first peak in the first frequency range and a second peak in the second frequency range. That is, the peak detector 206 determines the magnitude of the peaks. In some examples, the peak detector 206 determines the peak in a frequency range is the maximum value. Additionally or alternatively, the peak detector 206 detects a peak in response to the magnitude satisfying a threshold.

The example media rate detector 208 determines the presentation rate of the monitored media based on the detected peaks in the frequency spectrum. In some examples, the media rate detector 208 implements means for detecting a presentation rate. For example, the media rate detector 208 compares the first peak in the first frequency range and the second peak in the second frequency range. If the media rate detector 208 determines the magnitude of the first peak is greater than the magnitude of the second peak, the media rate detector 208 determines the presentation rate of the monitored media is the original speed. In some examples, the media rate detector 208 flags the frequency spectrum as the original speed. If the media rate detector 208 determines the magnitude of the first peak is less than the magnitude of the second peak, the media rate detector 208 determines the presentation rate of the monitored media is sped up with respect to the original presentation rate. In some examples, the media rate detector 208 flags the frequency spectrum as sped up.

The example signature generator 210 generates signatures representative of the monitored media. In some examples, the signature generator 210 implements means for generating signatures. For example, the signature generator 210 generates signatures based on the audio data (e.g., obtained from the A/D converter 202) and/or the frequency spectrum (e.g., obtained from the frequency transformer 204). In some examples, the signature generator 210 generates signatures using a first signature generation technique in response to the frequency spectrum being flagged as original speed. In such examples, the signature generator 210 generates signatures using a second signature generation technique in response to the frequency spectrum being flagged as sped up. Additionally or alternatively, the signature generator 210 generates signatures and flags the signatures with an indicator of the determined presentation rate. For example, the signature generator 210 can flag signatures as sped up, original speed, etc. Example signature generation techniques that may be implemented by the signature generator 210 include, but are not limited to, examples disclosed in U.S. Pat. No. 4,677,466 issued to Lert et al. on Jun. 30, 1987; U.S. Pat. No. 5,481,294 issued to Thomas et al. on Jan. 2, 1996; U.S. Pat. No. 7,460,684 issued to Srinivasan on Dec. 2, 2008; U.S. Pat. No. 9,438,940 issued to Nelson on Sep. 6, 2016; U.S. Pat. No. 9,548,830 issued to Kariyappa et al. on Jan. 17, 2017; U.S. Pat. No. 9,668,020 issued to Nelson et al. on May 30, 2017; U.S. Pat. No. 10,200,546 issued to Nelson et al. on Feb. 5, 2019; U.S. Publication No. 2005/0232411 to Srinivasan et al. published on Oct. 20, 2005; U.S. Publication No. 2006/0153296 to Deng published on Jul. 13, 2006; U.S. Publication No. 2006/0184961 to Lee et al. published on Aug. 17, 2006; U.S. Publication No. 2006/0195861 to Lee published on Aug. 31, 2006; U.S. Publication No. 2007/0274537 to Srinivasan published on Nov. 29, 2007; U.S. Publication No. 2008/0091288 to Srinivasan published on Apr. 17, 2008; and U.S. Publication No. 2008/0276265 to Topchy et al. published on Nov. 6, 2008.

The meter data reporter 212 transmits the signatures to the central office 110 (FIG. 1). In some examples, the meter data reporter 212 implements means for transmitting data. For example, the meter data reporter 212 transmits the signatures to the home unit 108 (FIG. 1) and/or directly to the central office 110 for further processing. In some examples, the meter data reporter 212 can convert the signatures into a format readable by the meter data analyzer 112. In some examples, the meter data reporter 212 can be in continuous communication with the home unit 108 and/or the central office 110. In other examples, the meter data reporter 212 can be in intermittent (e.g., periodic or aperiodic) communication with the home unit 108 and/or the central office 110.

The example CPU 214 of the illustrated example is hardware. For example, the CPU 214 can be implemented by one or more integrated circuits, logic circuits, microprocessors, or controllers from any desired family or manufacturer. The hardware processor may be a semiconductor based (e.g., silicon based) device. In some examples, the CPU 214 implements the example A/D converter 202, the example frequency transformer 204, the example peak detector 206, the example media rate detector 208, the example signature generator 210, and the example meter data reporter 212.

The CPU 214 of the illustrated example is in communication with a main memory including the RAM 216 via the system bus 218. The RAM 216 may be implemented by Synchronous Dynamic Random Access Memory (SDRAM), Dynamic Random Access Memory (DRAM), RAMBUS® Dynamic Random Access Memory (RDRAM®) and/or any other type of random access memory device. Additionally or alternatively, the RAM 216 may be implemented by flash memory and/or any other desired type of memory device. Access to the RAM 216 is controlled by a memory controller.

Figure 3:
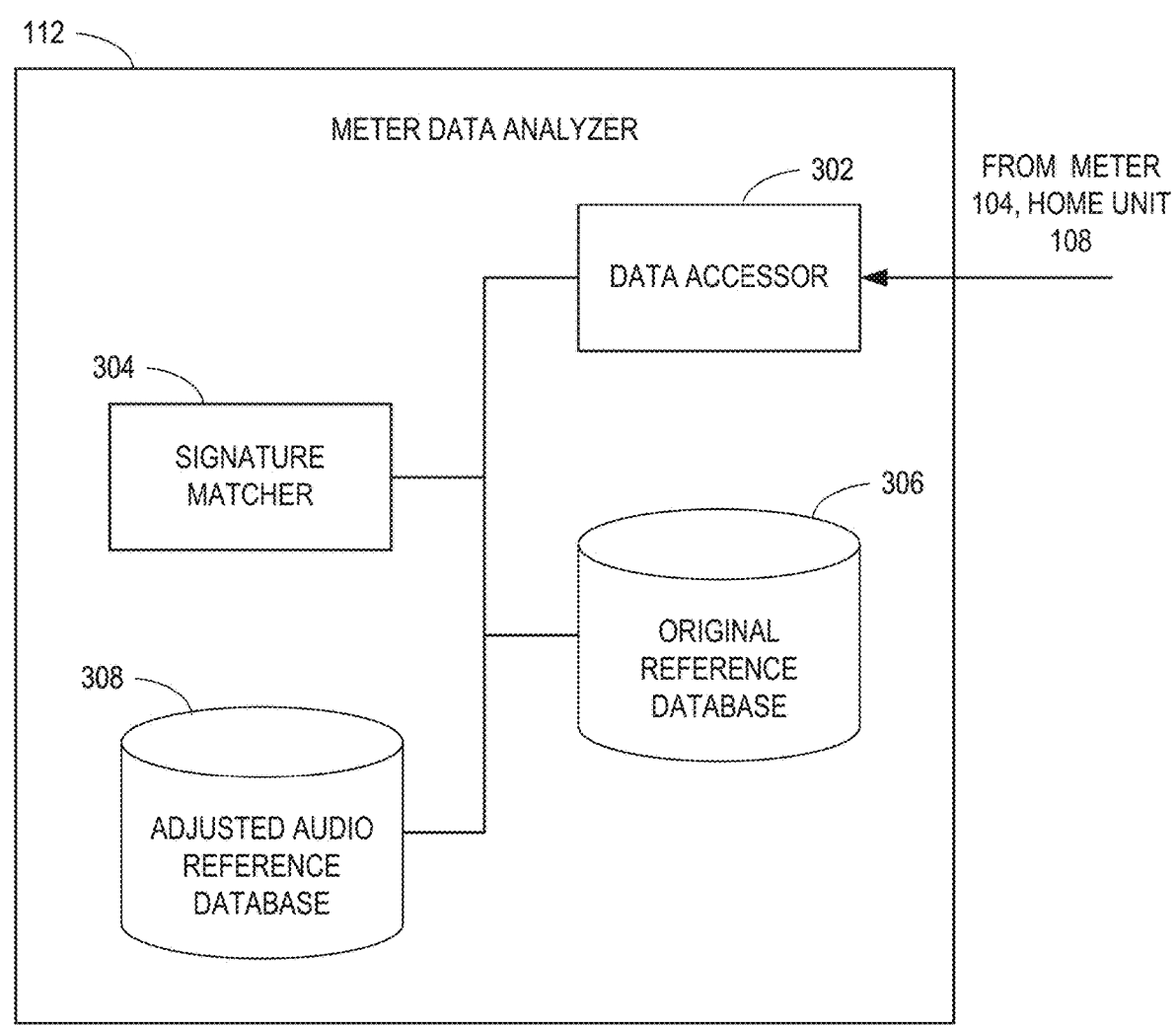
FIG. 3 is a block diagram of an example first implementation of a meter data analyzer included in the example environment of FIG. 1.

FIG. 3 is a block diagram of an example first implementation of the meter data analyzer 112 included in the example environment 100 of FIG. 1. The example meter data analyzer 112 includes an example data accessor 302, an example signature matcher 304, an example original reference database 306, and an example adjusted audio reference database 308.

The example data accessor 302 accesses data from the meter 104 (FIG. 1) and/or the home unit 108 (FIG. 1). In some examples, the data accessor 302 implements means for accessing data. For example, the data accessor 302 accesses the signatures transmitted by the meter data reporter 212 (FIG. 2). In some examples, the data accessor 302 accesses the signatures in response to a query, on a manual basis, on a periodic basis, or on a scheduled basis. For example, the data accessor 302 may access the signatures once a week, once a month, once a quarter, once a year, etc. to credit monitored media. In some examples, the data accessor 302 harmonizes, normalizes, and/or otherwise formats the data accessed from the meter 104 and/or the home unit 108.

The example signature matcher 304 compares the monitored media signatures accessed by the data accessor 302 to reference signatures stored in the original reference database 306 and/or the adjusted audio reference database 308 to identify signature matches. In some examples, the signature matcher 304 implements means for comparing signatures. The example signature matcher 304 determines the signature search algorithm to use and/or determines which set of reference signatures to compare the monitored media signatures with based on the detected presentation rate. For example, the signature matcher 304 determines the presentation rate of the monitored media based on the flag set by the media rate detector 208 (FIG. 2). If the signature matcher 304 determines the monitored signatures are flagged as the original presentation rate, the signature matcher 304 determines if a sequence of the monitored media signatures matches a sequence of reference signatures stored in the original reference database 306. If the signature matcher 304 determines the monitored signatures are flagged as sped up, the signature matcher 304 determines if a sequence of the monitored media signatures match a sequence of reference signatures stored in the adjusted audio reference database 308. In response to determining a match between the monitored media signatures and reference signatures (e.g., stored in the original reference database 306 and/or the adjusted audio reference database 308), the signature matcher 304 can credit the corresponding reference asset as being exposed to a user of the environment 100 (FIG. 1). In examples disclosed herein, the signature matcher 304 may perform matching using any suitable means (e.g., unhashed matching, hashed matching, etc.) and/or comparison criteria, such as those described above. In some examples, the signature matcher 304 outputs signature match results that include a reference identifier identifying the reference media asset represented by the matched reference signatures.

The example original reference database 306 includes generated reference signatures created or otherwise obtained by the central office 110. The reference signatures stored in the original reference database 306 correspond to reference signatures of media assets at the original presentation rate. In some examples, the original reference database 306 can include a library (e.g., database, table, etc.) of reference signatures.

The example adjusted audio reference database 308 includes generated reference signatures created or otherwise obtained by the central office 110. The reference signatures stored in the adjusted audio reference database 308 correspond to reference signatures of media assets that are not the original presentation rate. For example, the reference signatures stored in the adjusted audio reference database 308 correspond to media assets that were sped up, slowed down, etc. In some examples, the adjusted audio reference database 308 can include a library (e.g., database, table, etc.) of reference signatures.

In some examples, the original reference database 306 and/or the adjusted audio reference database 308 include reference unhashed signatures and/or referenced hashed signatures. In some examples, the media monitoring entity associated with the original reference database 306 and/or the adjusted audio reference database 308 can directly monitor media source feeds to generate reference unhashed signatures and/or hashed signatures. In some examples, the media monitoring entity generates reference unhashed signatures and/or hashed signatures from downloaded media (e.g., SVOD assets), etc. In examples disclosed herein, reference signatures are generated using the same or similar techniques as the monitored media signatures, such that the monitored media signatures and reference signatures of the same asset match. In some examples, each reference signature stored in the original reference database 306 and/or the adjusted audio reference database 308 is associated with a specific reference media asset, such as, but not limited to, episodes of television programs (e.g., episodes of The Crown, Game of Thrones, The Office, etc.), movies of a movie collection (e.g., The Marvel Cinematic Universe, etc.), etc.

Figure 4:
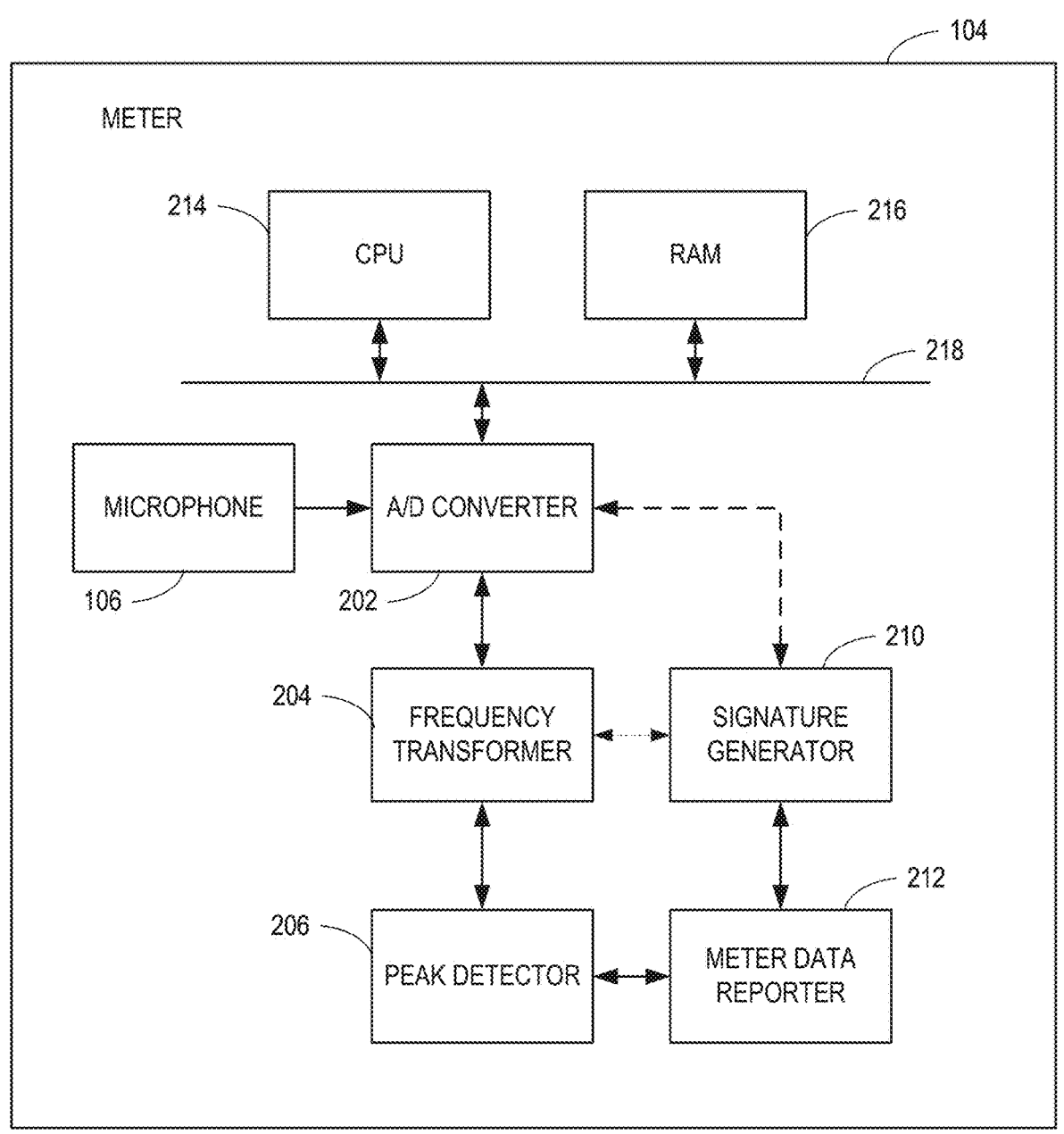
FIG. 4 is a block diagram of an example second implementation of the meter included in the example environment of FIG. 1.

FIG. 4 is a block diagram of an example second implementation of the meter 104 included in the example environment 100 of FIG. 1. The example meter 104 includes the example microphone 106 (FIG. 1), the example A/D converter 202 (FIG. 2), the example frequency transformer 204 (FIG. 2), the example peak detector 206 (FIG. 2), the example signature generator 210 (FIG. 2), the example meter data reporter 212 (FIG. 2), the example CPU 214 (FIG. 2), and the example RAM 216 (FIG. 2). Thus, the above discussion of like numbered components in FIG. 2 apply equally well to the like numbered parts of FIG. 4 and, to avoid redundancy, the like numbered components of FIG. 4 will not be separately described. Unlike the example first implementation of the meter 104 illustrated in FIG. 2, the meter 104 of FIG. 4 does not determine the presentation rate of the monitored media asset. For example, as described above, the microphone 106 collects audio data corresponding to a monitored media asset and the A/D converter 202 converts the audio data into digital audio data. The frequency transformer 204 generates a frequency spectrum corresponding to the audio data and the peak detector 206 identifies a first peak in a first frequency range and a second peak in a second frequency range.

The example signature generator 210 generates signatures corresponding to the audio data and/or the frequency spectrum of the audio data. In the illustrated example of FIG. 4, the meter data reporter 212 transmits the signatures and peak data to the home unit 108 (FIG. 1) and/or the central office 110 (FIG. 1). That is, the meter data reporter 212 transmits the peak data (e.g., the magnitude of the first peak, the magnitude of the second peak, etc.) for further processing by the meter data analyzer 112 (FIG. 1).

Figure 5:
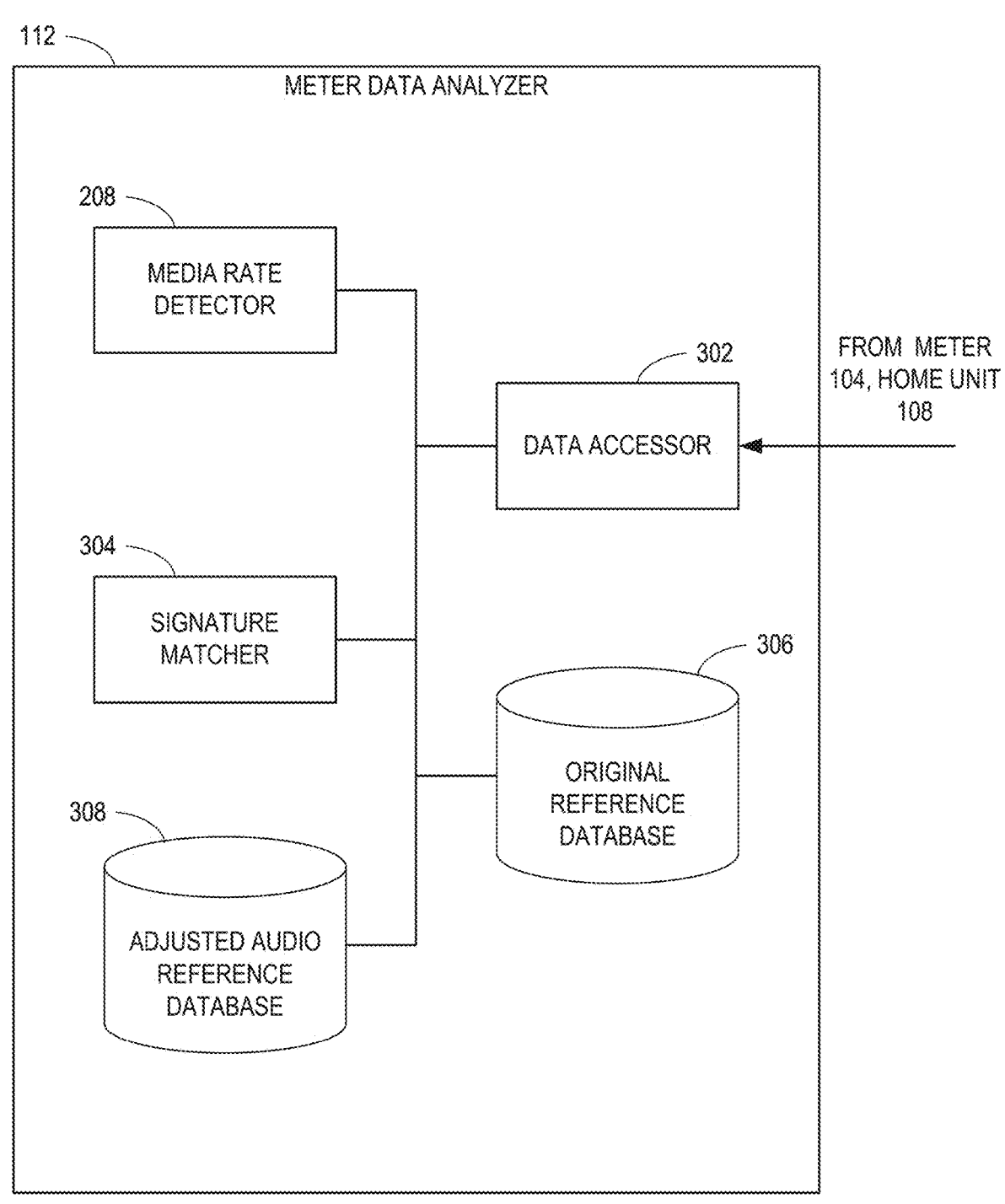
FIG. 5 is a block diagram of an example second implementation of the meter data analyzer included in the example environment of FIG. 1.

FIG. 5 is a block diagram of an example second implementation of the meter data analyzer 112 included in the example environment 100 of FIG. 1. The example meter data analyzer 112 of FIG. 5 includes the example data accessor 302 (FIG. 3), the example media rate detector 208 (FIG. 2), the example signature matcher 304 (FIG. 3), the example original reference database 306 (FIG. 3), and the example adjusted audio reference database 308 (FIG. 3). Thus, the above discussion of like numbered components in FIGS. 2 and/or 3 apply equally well to the like numbered parts of FIG. 5 and, to avoid redundancy, the like numbered components of FIG. 5 will not be separately described. Unlike the example first implementation of the meter data analyzer 112 illustrated in FIG. 3, the meter data analyzer 112 of FIG. 5 determines the presentation rate of the monitored media asset. For example, the data accessor 302 accesses the signatures and peak data generated by the meter 104 of FIG. 4.

The example media rate detector 208 determines the presentation rate of the monitored media based on the peak data (e.g., the magnitude of the first peak in the first frequency range and the magnitude of the second peak in the second frequency range). For example, as described above, the media rate detector 208 compares the magnitude of first peak and the magnitude of the second peak. If the media rate detector 208 determines the magnitude of the first peak is greater than the magnitude of the second peak, the media rate detector 208 flags the signatures as the original presentation rate. If the media rate detector 208 determines the magnitude of the first peak is less than the magnitude of the second peak, the media rate detector 208 flags the signatures as sped up.

The signature matcher 304 accesses the flagged signatures to identify signature matches. For example, as described above in connection with FIG. 3, the signature matcher 304 determines whether to compare the monitored signatures with reference signatures stored in the original reference database 306 or the adjusted audio reference database 308 based on the flag determined by the media rate detector 208. For example, if the signature matcher 304 determines the presentation rate is the original presentation rate, the signature matcher 304 compares the monitored signatures to the reference signatures of the original reference database 306. Additionally or alternatively, if the signature matcher 304 determines the presentation rate is sped up, the signature matcher 304 compares the monitored signatures to the reference signatures of the adjusted audio reference database 308.

Figure 6:
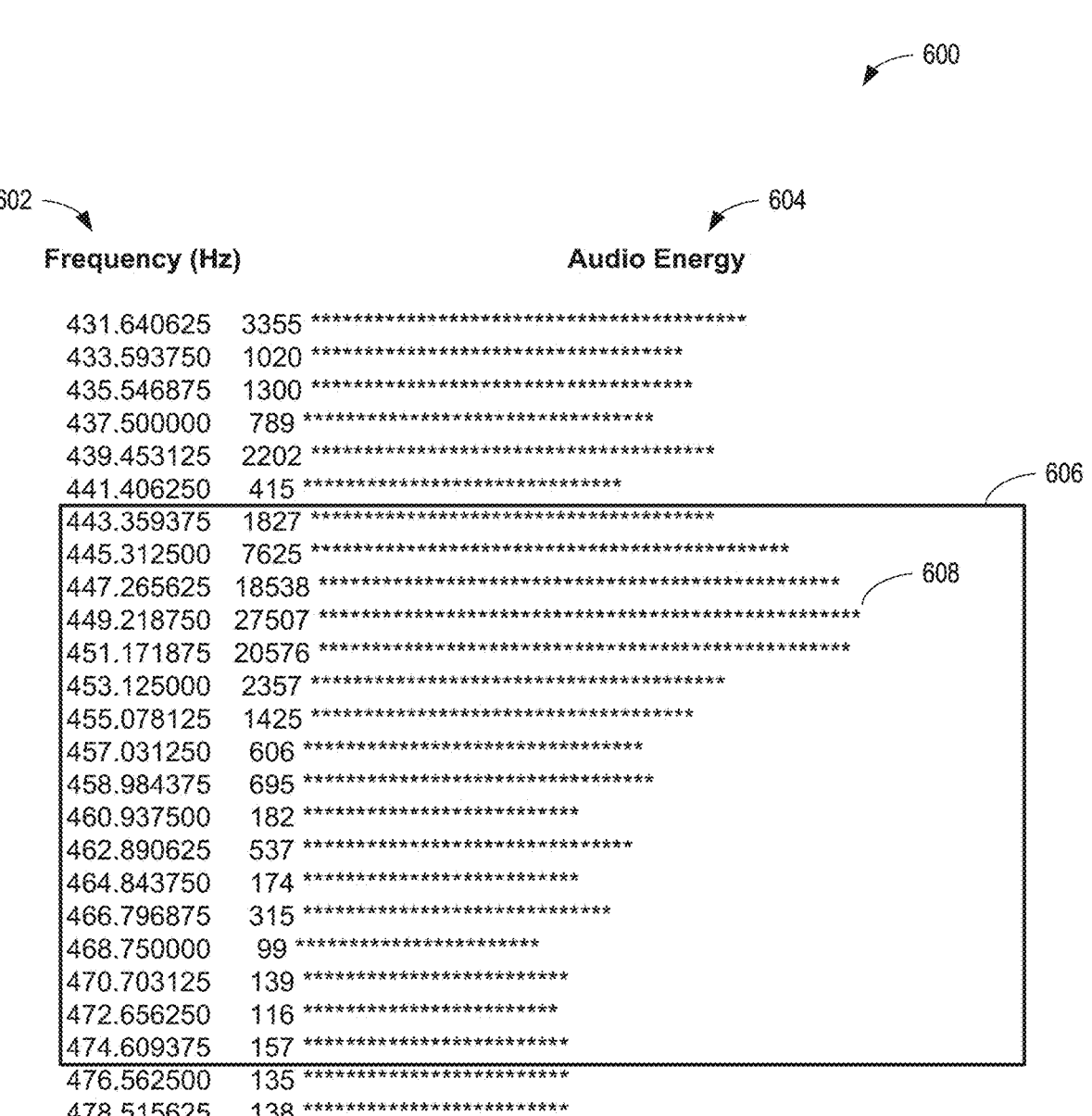
FIG. 6 illustrates example frequency spectrum data of a media asset at a first presentation rate.

FIG. 6 illustrates example frequency spectrum data 600 of a media asset at a first presentation rate. For example, the frequency transformer 204 of FIGS. 2 and/or 4 generates the frequency spectrum data 600 based on monitored media of the environment 100 (FIG. 1). For example, the frequency spectrum data 600 corresponds to the television show The Crown. In some examples, the frequency transformer 204 of FIGS. 2 and/or 4 generates the frequency spectrum data 600 based on audio energy from the monitored media accumulated over a time period (e.g., several seconds, several minutes, etc.). The frequency spectrum data 600 includes example frequencies 602 and example audio energy 604. For example, the frequencies 602 correspond to frequencies in Hz and the audio energy 604 corresponds to the magnitude of the frequencies 602. The illustrated example of FIG. 6 includes an example frequency range 606. For example, the frequency range 606 corresponds to a frequency range of 444 Hz to 475 Hz.

The example frequency spectrum data 600 includes an example peak 608. For example, the peak detector 206 of FIGS. 2 and/or 4 detects the peak 608 in the frequency range 606. For example, the peak detector 206 determines the peak 608 corresponds to a magnitude of 27,507 at approximately 449 Hz. In examples disclosed herein, media presented at an original presentation rate typically peaks around note A4 at 446 Hz, and media presented at a sped up presentation rate (e.g., 4.3%) typically peaks around note A4 at 465 Hz. In some examples, peak detector 206 identifies peaks (e.g., the peak 608) in the range of 444 Hz to 475 Hz to determine if there is a significant peak close to 446 Hz (e.g., indicating the presentation rate is the original presentation rate), if there is a significant peak close to 465 Hz (e.g., indicating the presentation rate is sped up), or if there are no significant peaks (e.g., indicating the frequency transformer 204 may need to generate the frequency spectrum data 600 based on audio energy from the monitored media accumulated over a longer period of time). In some examples, a significant peak is determined to be a peak that has a larger magnitude than the other peaks in the frequency range 606. In the illustrated example of FIG. 6, the peak detector 206 determines the peak 608 (at 449 Hz) is a significant peak close to 446 Hz. In such examples, the media rate detector 208 of FIGS. 2 and/or 5 determines the presentation rate of the monitored media asset was the original presentation rate. That is, the media rate detector 208 determines the magnitude of the peak 608 (at 449 Hz) is a significant peak close to 446 Hz.

Figure 7:
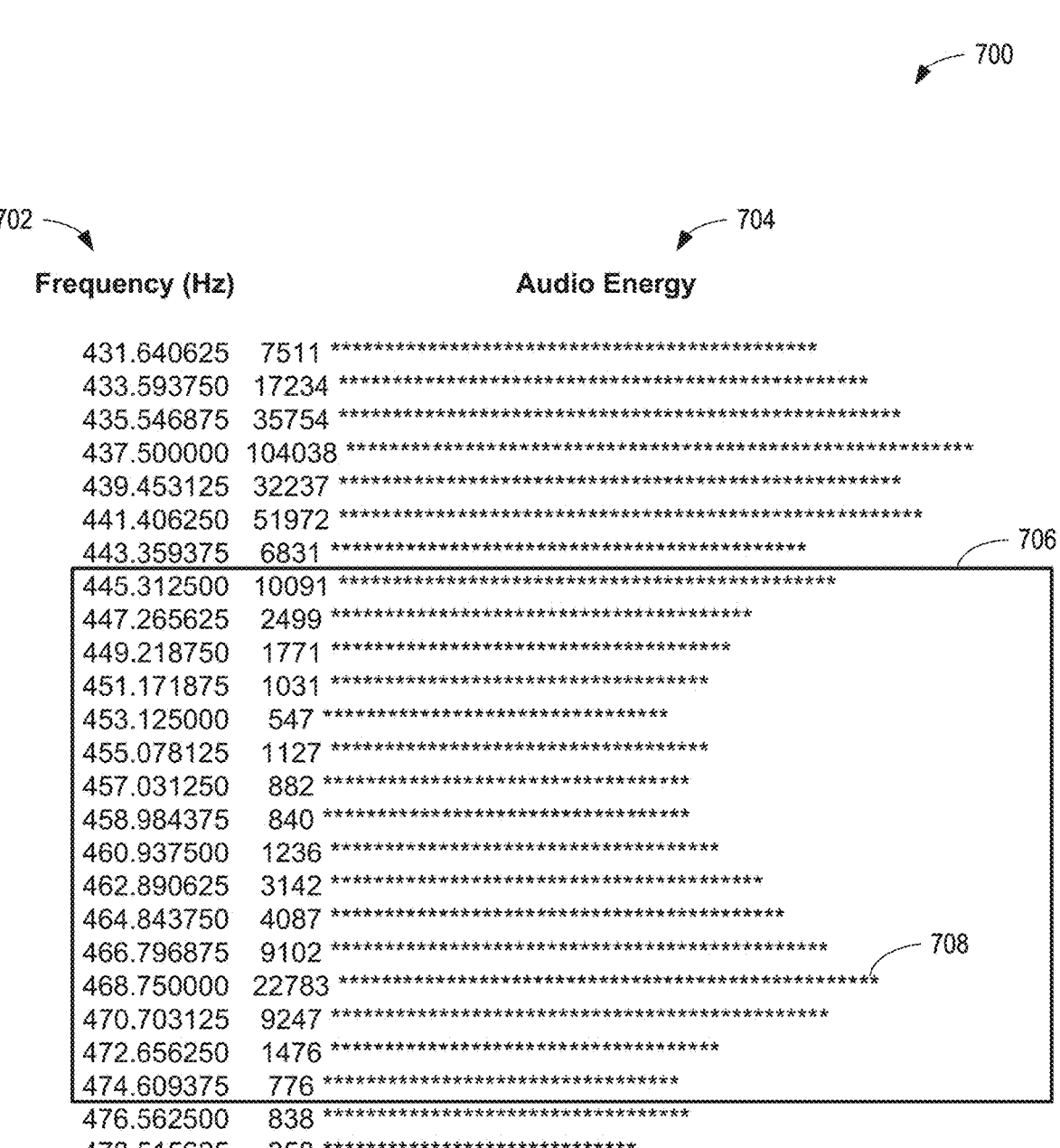
FIG. 7 illustrates example frequency spectrum data of the media asset of FIG. 6 at a second presentation rate.

FIG. 7 illustrates example frequency spectrum data 700 of the media asset of FIG. 6 at a second presentation rate. For example, the frequency spectrum data 700 corresponds to the television show The Crown sped up by 4.3%. For example, the frequency transformer 204 of FIGS. 2 and/or 4 generates the frequency spectrum data 700 based on monitored media of the environment 100 (FIG. 1). The frequency spectrum data 700 includes example frequencies 702 and example audio energy 704. The illustrated example of FIG. 7 includes an example frequency range 706. For example, the frequency range 706 corresponds to a frequency range of 444 Hz to 475 Hz.

The example frequency spectrum data 700 includes an example peak 708. For example, the peak detector 206 of FIGS. 2 and/or 4 detects the peak 708 in the frequency range 706. For example, the peak detector 206 determines the peak 708 corresponds to a magnitude of 22,783 at approximately 468 Hz. In some examples, peak detector 206 identifies peaks (e.g., the peak 708) in the range of 444 Hz to 475 Hz to determine if there is a significant peak close to 446 Hz (e.g., indicating the presentation rate is the original presentation rate), if there is a significant peak close to 465 Hz (e.g., indicating the presentation rate is sped up), or if there are no significant peaks (e.g., indicating the frequency transformer 204 may need to generate the frequency spectrum data 700 based on audio energy from the monitored media accumulated over a longer period of time). In some examples, a significant peak is determined to be a peak that has a larger magnitude than the other peaks in the frequency range 706. In the illustrated example of FIG. 7, the peak detector 206 determines the peak 708 (at 468 Hz) is a significant peak close to 465 Hz. In such examples, the media rate detector 208 of FIGS. 2 and/or 5 determines the presentation rate of the monitored media asset is sped up. That is, the media rate detector 208 determines the magnitude of the peak 708 (at 468 Hz) is a significant peak close to 465 Hz.

While an example manner of implementing the meter 104 of FIG. 1 is illustrated in FIGS. 2 and/or 4, one or more of the elements, processes and/or devices illustrated in FIGS. 2 and/or 4 may be combined, divided, re-arranged, omitted, eliminated and/or implemented in any other way. Further, the example microphone 106, the example A/D converter 202, the example frequency transformer 204, the example peak detector 206, the example media rate detector 208, the example signature generator 210, the example meter data reporter 212, the example CPU 214, the example RAM 216 and/or, more generally, the example meter 104 of FIGS. 2 and/or 4 may be implemented by hardware, software, firmware and/or any combination of hardware, software and/or firmware. Thus, for example, any of the example microphone 106, the example A/D converter 202, the example frequency transformer 204, the example peak detector 206, the example media rate detector 208, the example signature generator 210, the example meter data reporter 212, the example CPU 214, the example RAM 216 and/or, more generally, the example meter 104 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, microphone 106, the example A/D converter 202, the example frequency transformer 204, the example peak detector 206, the example media rate detector 208, the example signature generator 210, the example meter data reporter 212, the example CPU 214, the example RAM 216, and/or the example meter 104 is/are hereby expressly defined to include a non-transitory computer readable storage device or storage disk such as a memory, a digital versatile disk (DVD), a compact disk (CD), a Blu-ray disk, etc. including the software and/or firmware. Further still, the example meter 104 of FIGS. 2 and/or 4 may include one or more elements, processes and/or devices in addition to, or instead of, those illustrated in FIGS. 2 and/or 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 8:
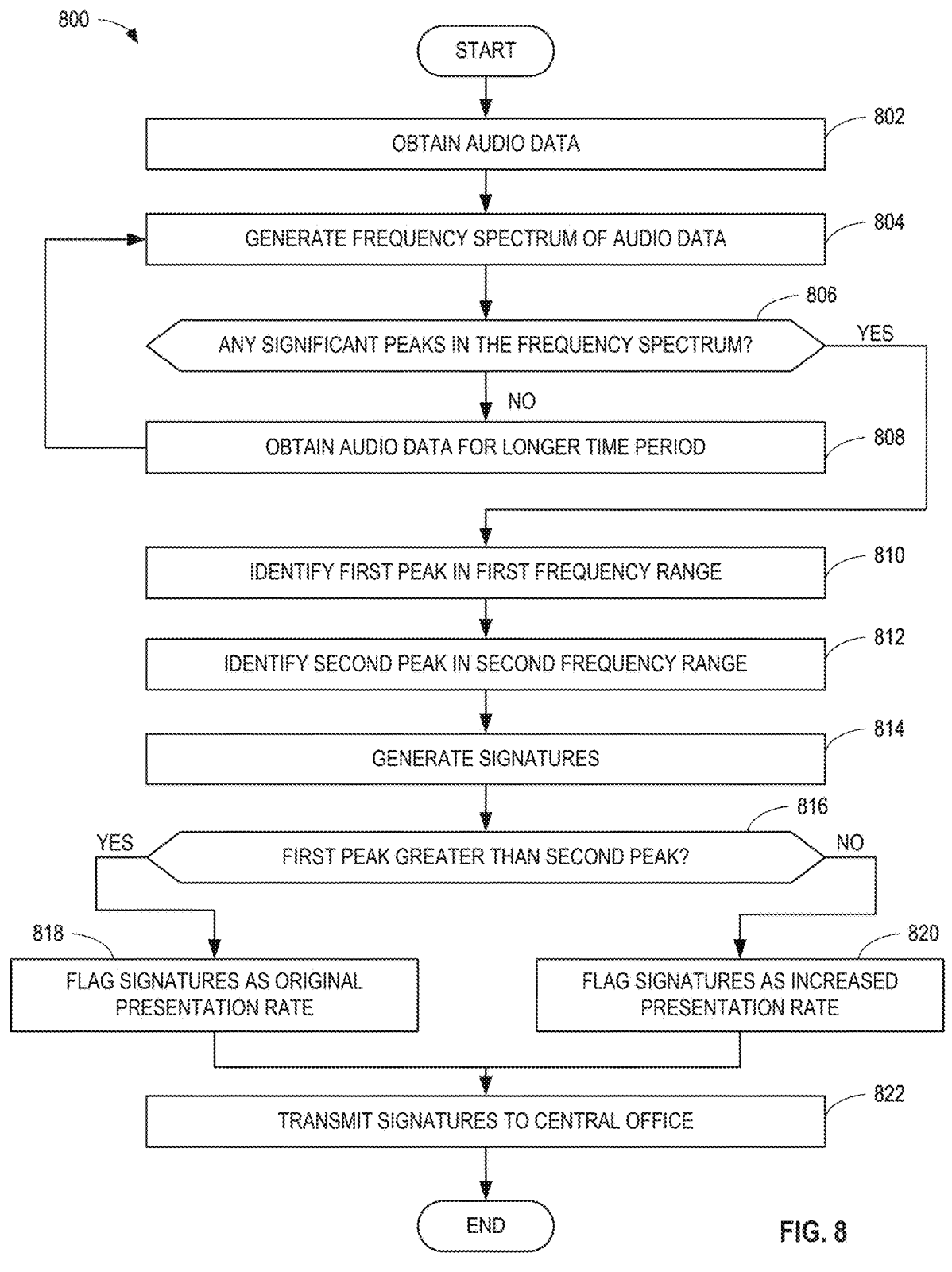
FIG. 8 is a flowchart representative of example machine readable instructions which may be executed to implement the meter of FIGS. 1 and/or 2.

A flowchart representative of example hardware logic, machine readable instructions, hardware implemented state machines, and/or any combination thereof for implementing the meter 104 of FIGS. 1 and/or 2 is shown in FIG. 8. The machine readable instructions may be one or more executable programs or portion(s) of an executable program for execution by a computer processor and/or processor circuitry, such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIG. 8, many other methods of implementing the example meter 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

A flowchart representative of example hardware logic, machine readable instructions, hardware implemented state machines, and/or any combination thereof for implementing the meter 104 of FIGS. 1 and/or 4 is shown in FIG. 10. The machine readable instructions may be one or more executable programs or portion(s) of an executable program for execution by a computer processor and/or processor circuitry, such as the processor 1412 shown in the example processor platform 1400 discussed below in connection with FIG. 14. The program may be embodied in software stored on a non-transitory computer readable storage medium such as a CD-ROM, a floppy disk, a hard drive, a DVD, a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowchart illustrated in FIG. 10, many other methods of implementing the example meter 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

While an example manner of implementing the meter data analyzer 112 of FIG. 1 is illustrated in FIGS. 3 and/or 5, one or more of the elements, processes and/or devices illustrated in FIGS. 3 and/or 5 may be combined, divided, re-arranged, omitted, eliminated and/or implemented in any other way. Further, the example media rate detector 208, the example data accessor 302, the example signature matcher 304, the example original reference database 306, the example adjusted audio reference database 308 and/or, more generally, the example meter data analyzer 112 of FIGS. 3 and/or 5 may be implemented by hardware, software, firmware and/or any combination of hardware, software and/or firmware. Thus, for example, any of the example media rate detector 208, the example data accessor 302, the example signature matcher 304, the example original reference database 306, the example adjusted audio reference database 308 and/or, more generally, the example meter data analyzer 112 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, media rate detector 208, the example data accessor 302, the example signature matcher 304, the example original reference database 306, the example adjusted audio reference database 308, and/or the example meter data analyzer 112 is/are hereby expressly defined to include a non-transitory computer readable storage device or storage disk such as a memory, a digital versatile disk (DVD), a compact disk (CD), a Blu-ray disk, etc. including the software and/or firmware. Further still, the example meter data analyzer 112 of FIGS. 3 and/or 5 may include one or more elements, processes and/or devices in addition to, or instead of, those illustrated in FIGS. 3 and/or 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 9:
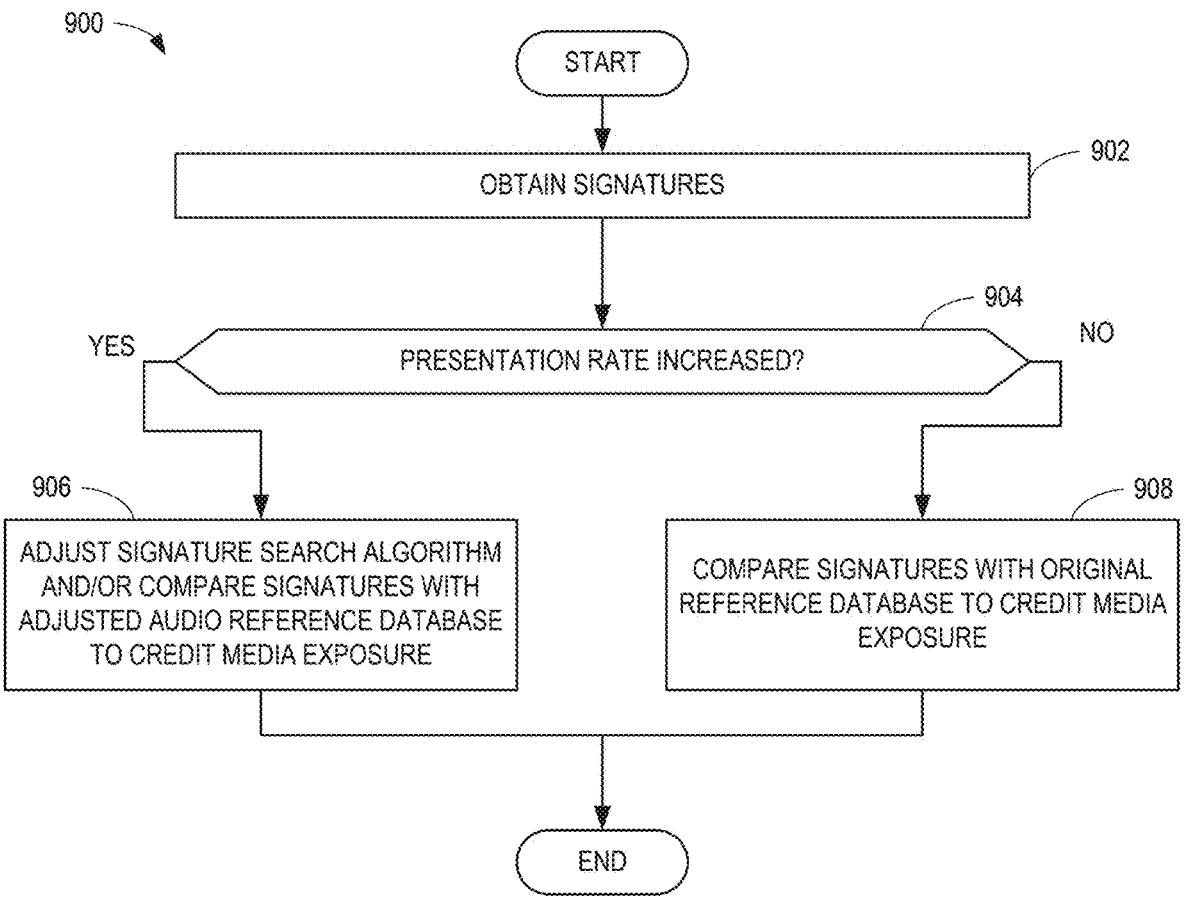
FIG. 9 is a flowchart representative of example machine readable instructions which may be executed to implement the meter data analyzer of FIGS. 1 and/or 3.

A flowchart representative of example hardware logic, machine readable instructions, hardware implemented state machines, and/or any combination thereof for implementing the meter data analyzer 112 of FIGS. 1 and/or 3 is shown in FIG. 9. The machine readable instructions may be one or more executable programs or portion(s) of an executable program for execution by a computer processor and/or processor circuitry, such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowchart illustrated in FIG. 9, many other methods of implementing the example meter data analyzer 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

Figure 11:
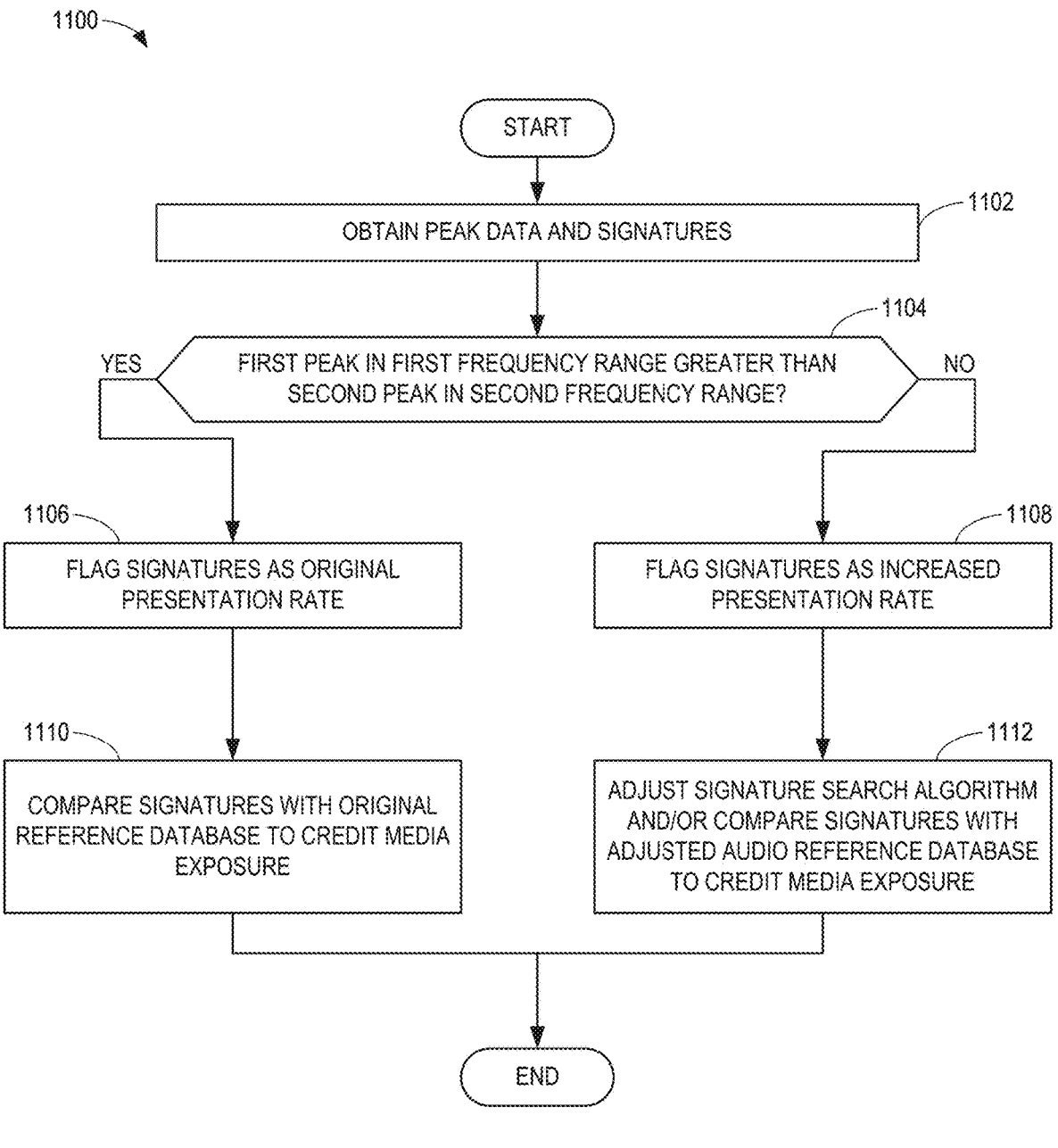
FIG. 11 is a flowchart representative of example machine readable instructions which may be executed to implement the meter data analyzer of FIGS. 1 and/or 5.

A flowchart representative of example hardware logic, machine readable instructions, hardware implemented state machines, and/or any combination thereof for implementing the meter data analyzer 112 of FIGS. 1 and/or 5 is shown in FIG. 11. The machine readable instructions may be one or more executable programs or portion(s) of an executable program for execution by a computer processor and/or processor circuitry, such as the processor 1512 shown in the example processor platform 1500 discussed below in connection with FIG. 15. The program may be embodied in software stored on a non-transitory computer readable storage medium such as a CD-ROM, a floppy disk, a hard drive, a DVD, a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the flowchart illustrated in FIG. 11, many other methods of implementing the example meter data analyzer 112 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine.

For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 8-11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 8 is a flowchart representative of machine readable instructions 800 which may be executed to implement the meter 104 of FIGS. 1 and/or 2. The machine readable instructions 800 begin at block 802, at which the frequency transformer 204 (FIG. 2) obtains audio data. For example, the frequency transformer 204 obtains audio data recorded by the microphone 106 (FIG. 1). In some examples, the audio data is digital audio data (e.g., generated by the example A/D converter 202 of FIG. 2). In some examples, the audio data may be buffered in a memory.

The example frequency transformer 204 generates a frequency spectrum of the audio data (block 804). For example, the frequency transformer 204 performs a Fourier transform on the audio data to generate the frequency spectrum. The example peak detector 206 (FIG. 2) determines if there are any significant peaks in the frequency spectrum of the audio data (block 806). In some examples, a significant peak is determined to be a frequency peak that has a larger magnitude than the other peaks in the frequency spectrum. For example, the peak detector 206 determines if the frequency spectrum includes any frequencies with magnitudes larger than the other frequencies. In some examples, the peak detector 206 may determine there are significant peaks if the frequency spectrum includes any frequencies with magnitudes larger than a threshold. If, at block 806, the peak detector 206 determines there are no significant peaks in the frequency spectrum, the frequency transformer 204 obtains audio data for a longer time period (block 808). If, at block 806, the peak detector 206 determines there are significant peaks in the frequency spectrum, the peak detector 206 identifies a first peak in a first frequency range of the frequency spectrum (block 810). For example, the peak detector 206 identifies a peak in a first frequency range between 440 Hz and 453 Hz. The example peak detector 206 identifies a second peak in a second frequency range of the frequency spectrum (block 812). For example, peak detector 206 identifies a peak in a second frequency range between 454 Hz and 468 Hz.

The example signature generator 210 (FIG. 2) generates signatures (block 814). For example, the signature generator 210 obtains the audio data from the example A/D converter 202 (FIG. 2) and/or the frequency spectrum from the frequency transformer 204. The signature generator 210 generates signatures representative of the monitored media.

The example media rate detector 208 (FIG. 2) determines whether the first peak is greater than the second peak (block 816). For example, the media rate detector 208 compares the magnitude of the first peak to the magnitude of the second peak. If, at block 816, the media rate detector 208 determines the first peak is greater than the second peak, the media rate detector 208 flags the signatures as the original presentation rate (block 818). That is, the media rate detector 208 determines the presentation rate of the monitored media is the original presentation rate. If, at block 816, the media rate detector 208 determines the first peak is not greater than the second peak, the media rate detector 208 flags the signatures as an increased presentation rate (block 820). That is, the media rate detector 208 determines the presentation rate of the monitored media is sped up.

The example meter data reporter 212 (FIG. 2) transmits the signatures to the central office 110 (FIG. 1) (block 822). For example, the meter data reporter 212 transmits the signatures to the home unit 108 (FIG. 1) and/or the meter data analyzer 112 (FIGS. 1 and/or 3).

FIG. 9 is a flowchart representative of machine readable instructions 900 which may be executed to implement the meter data analyzer 112 of FIGS. 1 and/or 3. The machine readable instructions 900 begin at block 902, at which the example data accessor 302 (FIG. 3) obtains signatures. For example, the data accessor 302 obtains the signatures generated by the meter 104 (FIG. 1). The example signature matcher 304 (FIG. 3) determines whether the presentation rate increased (block 904). For example, the signature matcher 304 determines whether the presentation rate of the monitored media corresponding to the signatures is sped up or is the original presentation rate.

If, at block 904, the signature matcher 304 determines the presentation rate increased, the signature matcher 304 adjusts the signature search algorithm and/or compares the signatures with reference signatures stored in the adjusted audio reference database 308 (FIG. 3) to credit the media exposure (block 906). For example, the signature matcher 304 compares the monitored signatures to the reference signatures stored in the adjusted audio reference database 308 to determine whether there is a signature match. If the signature matcher 304 determines there is a signature match, the signature matcher 304 can credit the corresponding reference media asset as being exposed.

If, at block 904, the signature matcher 304 determines the presentation rate is not increased, the signature matcher 304 compares the monitored signatures to the reference signatures stored in the original reference database 306 (FIG. 3) to credit the media exposure (block 908). For example, the signature matcher 304 compares the monitored signatures to the reference signatures stored in the original reference database 306 to determine whether there is a signature match. If the signature matcher 304 determines there is a signature match, the signature matcher 304 can credit the corresponding reference media asset as being exposed.

FIG. 10 is a flowchart representative of machine readable instructions 1000 which may be executed to implement the meter 104 of FIGS. 1 and/or 4. The machine readable instructions 1000 begin at block 1002, at which the example frequency transformer 204 (FIG. 4) obtains audio data. For example, the frequency transformer 204 obtains audio data recorded by the microphone 106 (FIG. 1).

The example frequency transformer 204 generates a frequency spectrum of the audio data (block 1004). For example, the frequency transformer 204 performs a Fourier transform on the audio data to generate the frequency spectrum. The example peak detector 206 (FIG. 4) identifies a first peak in a first frequency range of the frequency spectrum (block 1006). For example, the peak detector 206 identifies a peak in a first frequency range between 440 Hz and 453 Hz. The example peak detector 206 identifies a second peak in a second frequency range of the frequency spectrum (block 1008). For example, peak detector 206 identifies a peak in a second frequency range between 454 Hz and 468 Hz.

The example signature generator 210 (FIG. 4) generates signatures (block 1010). For example, the signature generator 210 obtains the audio data from the example A/D converter 202 (FIG. 4) and/or the frequency spectrum from the frequency transformer 204. The signature generator 210 generates signatures representative of the monitored media. The example meter data reporter 212 (FIG. 4) transmits the peak data and the signatures to the central office 110 (FIG. 1) (block 1012). For example, the meter data reporter 212 transmits the peak data (e.g., the magnitude of the first peak and the magnitude of the second peak) and the signatures to the home unit 108 (FIG. 1) and/or the meter data analyzer 112 (FIGS. 1 and/or 5).

FIG. 11 is a flowchart representative of machine readable instructions 1100 which may be executed to implement the meter data analyzer 112 of FIGS. 1 and/or 5. The machine readable instructions 1100 begin at block 1102, at which the example data accessor 302 (FIG. 5) obtains the peak data and the monitored signatures (block 1102). For example, the data accessor 302 obtains the peak data and the monitored signatures generated by the meter 104 (FIG. 4).

The example media rate detector 208 (FIG. 5) determines whether the first peak in a first frequency range is greater than the second peak in a second frequency range (block 1104). For example, the media rate detector 208 determines whether the magnitude of the first peak is greater than the magnitude of the second peak. In some examples, the first frequency range is between 440 Hz and 453 Hz, and the second frequency range is between 454 Hz and 468 Hz. If, at block 1104, the media rate detector 208 determines the first peak is greater than the second peak, the media rate detector 208 flags the monitored signatures as the original presentation rate (block 1106). That is, the media rate detector 208 determines the presentation rate of the monitored media is the original presentation rate. If, at block 1104, the media rate detector 208 determines the first peak is not greater than the second peak, the media rate detector 208 flags the signatures as an increased presentation rate (block 1108). That is, the media rate detector 208 determines the presentation rate of the monitored media is sped up.

The example signature matcher 304 (FIG. 5) compares the monitored signatures to the reference signatures stored in the original reference database 306 (FIG. 5) to credit the media exposure (block 1110). For example, the signature matcher 304 compares the monitored signatures to the reference signatures stored in the original reference database 306 to determine whether there is a signature match. That is, the flag of the signatures is set as the original presentation rate (e.g., at block 1106). If the signature matcher 304 determines there is a signature match, the signature matcher 304 can credit the corresponding reference media asset as being exposed.

The signature matcher 304 adjusts the signature search algorithm and/or compares the signatures with reference signatures stored in the adjusted audio reference database 308 (FIG. 5) to credit the media exposure (block 1112). For example, the signature matcher 304 compares the monitored signatures to the reference signatures stored in the adjusted audio reference database 308 to determine whether there is a signature match. That is, the flag of the signatures is set as an increased presentation rate (e.g., at block 1108). If the signature matcher 304 determines there is a signature match, the signature matcher 304 can credit the corresponding reference media asset as being exposed.

Additionally or alternatively, the example signature matcher 304 determines whether the presentation rate increased. For example, the signature matcher 304 determines whether the presentation rate of the monitored media corresponding to the signatures is sped up or is the original presentation rate based on the flag set by the media rate detector 208. Thus, the signature matcher 304 performs signature matching based on the flag (e.g., whether the flag is set for the original presentation rate or an increased presentation rate). Flagging the presentation rate of the signatures (e.g., at blocks 1106, 1108) allows for signature matching to be performed in a post-processing manner (e.g., at a later time than the presentation of the media, etc.). Thus, examples disclosed herein improve the efficiency of processing signatures (e.g., during a period of time when an increased amount of signatures are received from the meter 104, etc.).

Additionally or alternatively, the media rate detector 208 does not flag the presentation rate of the signatures. In such examples, the machine readable instructions 1100 do not include blocks 1106, 1108. For example, the media rate detector 208 determines whether the first peak is greater than the second peak (e.g., block 1104). If, at block 1104, the media rate detector 208 determines the first peak is greater than the second peak, the signature matcher 304 compares the monitored signatures to the reference signatures stored in the original reference database 306 to credit the media exposure (e.g., block 1110). If, at block 1104, the media rate detector 208 determines the first peak is not greater than the second peak, the signature matcher 304 adjusts the signature search algorithm and/or compares the signatures with reference signatures stored in the adjusted audio reference database 308 to credit the media exposure (e.g., block 1112).

Figure 12:
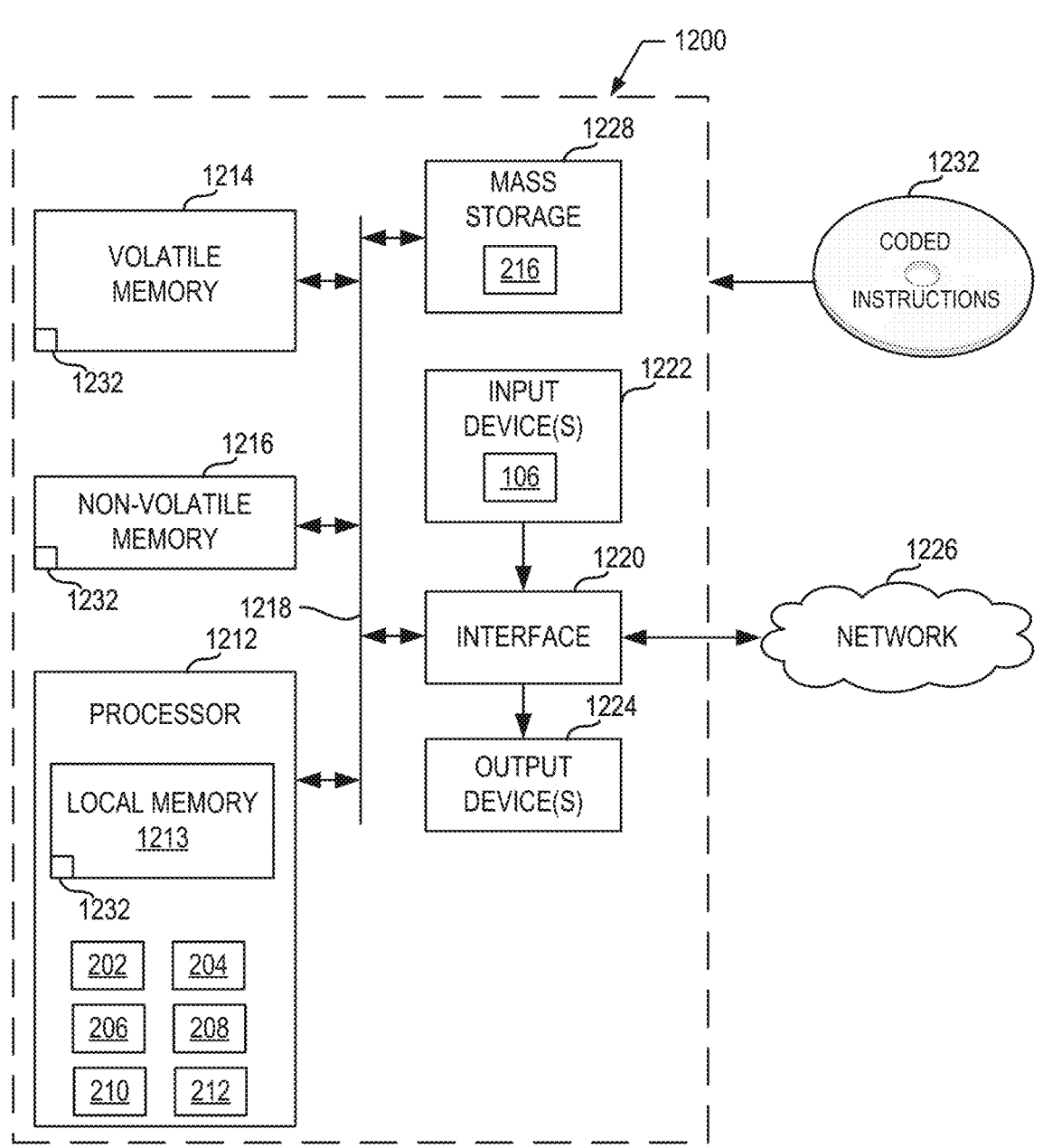
FIG. 12 is a block diagram of an example processing platform structured to execute the instructions of FIG. 8 to implement the meter of FIGS. 1 and/or 2.

FIG. 12 is a block diagram of an example processor platform 1200 structured to execute the instructions of FIG. 8 to implement the meter 104 of FIG. 2. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example A/D converter 202, the example frequency transformer 204, the example peak detector 206, the example media rate detector 208, the example signature generator 210, and the example meter data reporter 212.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random-dom Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIG. 8 may be stored in the mass storage device 1228, in the volatile memory 1214, in the non-volatile memory 1216, and/or on a removable non-transitory computer readable storage medium such as a CD or DVD.

Figure 13:
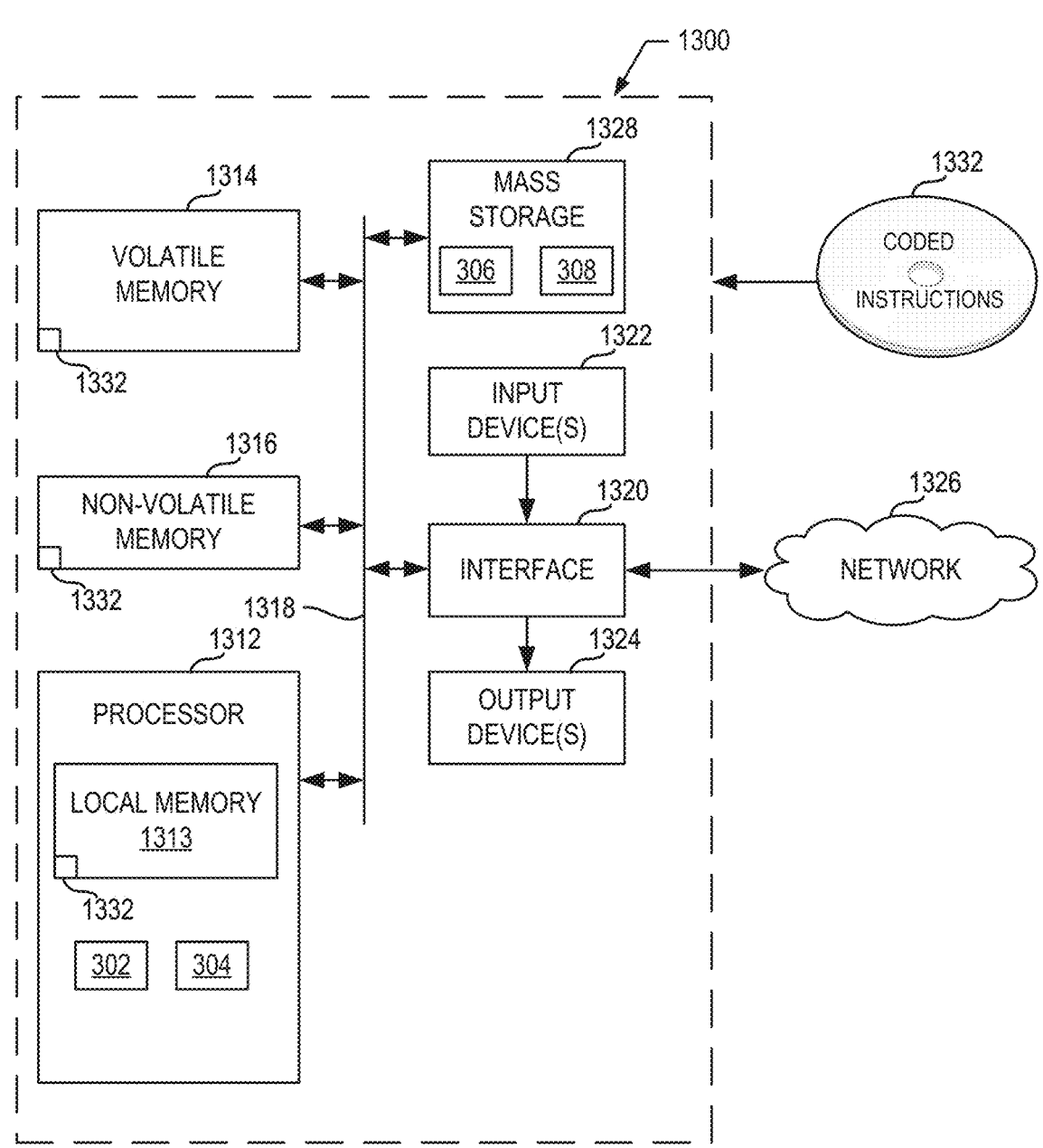
FIG. 13 is a block diagram of an example processing platform structured to execute the instructions of FIG. 9 to implement the meter data analyzer of FIGS. 1 and/or 3.

FIG. 13 is a block diagram of an example processor platform 1300 structured to execute the instructions of FIG. 9 to implement the meter data analyzer of FIG. 3. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data accessor 302 and the example signature matcher 304.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random-dom Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1332 of FIG. 9 may be stored in the mass storage device 1328, in the volatile memory 1314, in the non-volatile memory 1316, and/or on a removable non-transitory computer readable storage medium such as a CD or DVD.

Figure 14:
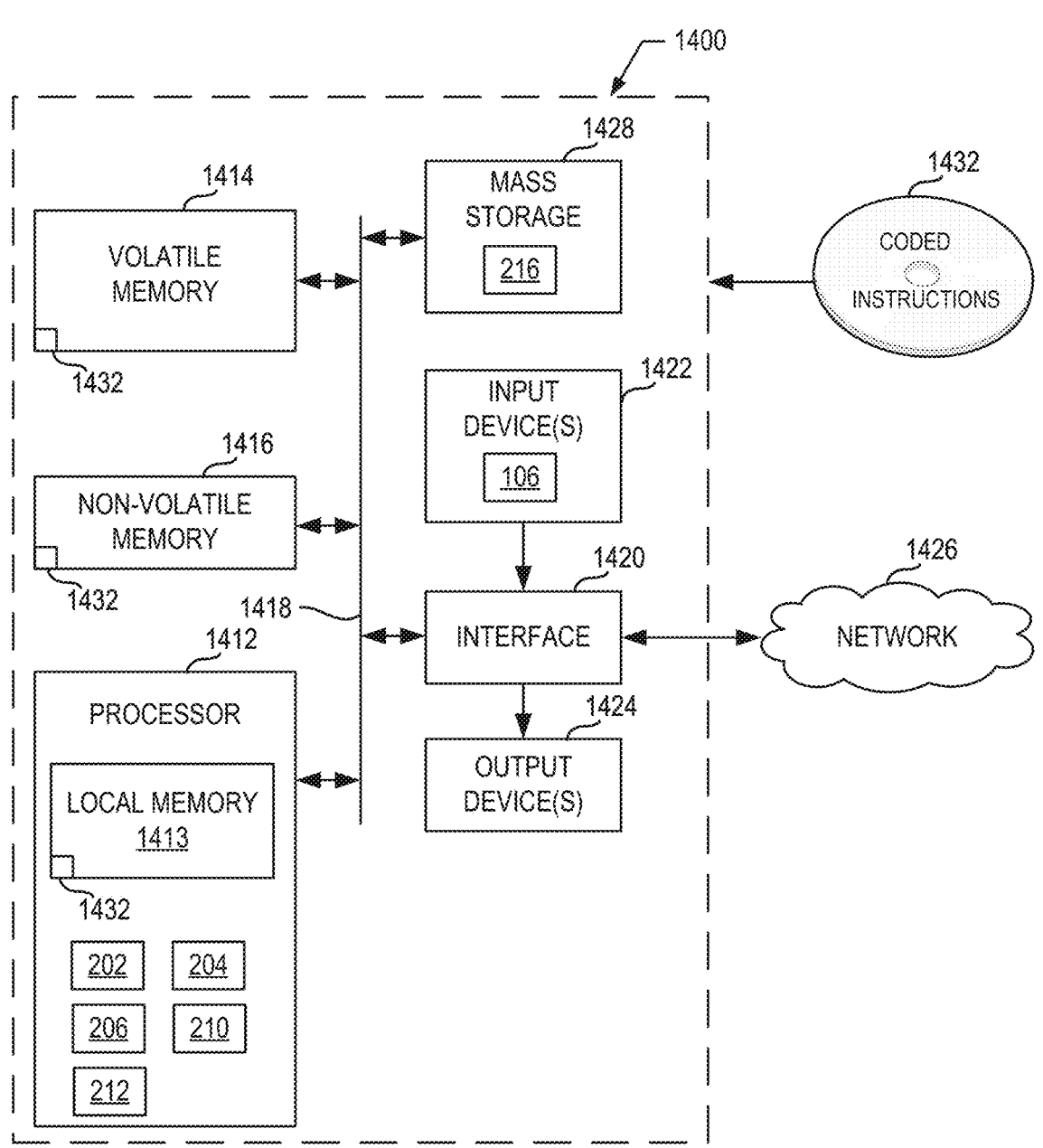
FIG. 14 is a block diagram of an example processing platform structured to execute the instructions of FIG. 10 to implement the meter of FIGS. 1 and/or 4.

FIG. 14 is a block diagram of an example processor platform 1400 structured to execute the instructions of FIG. 10 to implement the meter 104 of FIG. 4. The processor platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example A/D converter 202, the example frequency transformer 204, the example peak detector 206, the example signature generator 210, and the example meter data reporter 212.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives.

The machine executable instructions 1432 of FIG. 10 may be stored in the mass storage device 1428, in the volatile memory 1414, in the non-volatile memory 1416, and/or on a removable non-transitory computer readable storage medium such as a CD or DVD.

Figure 15:
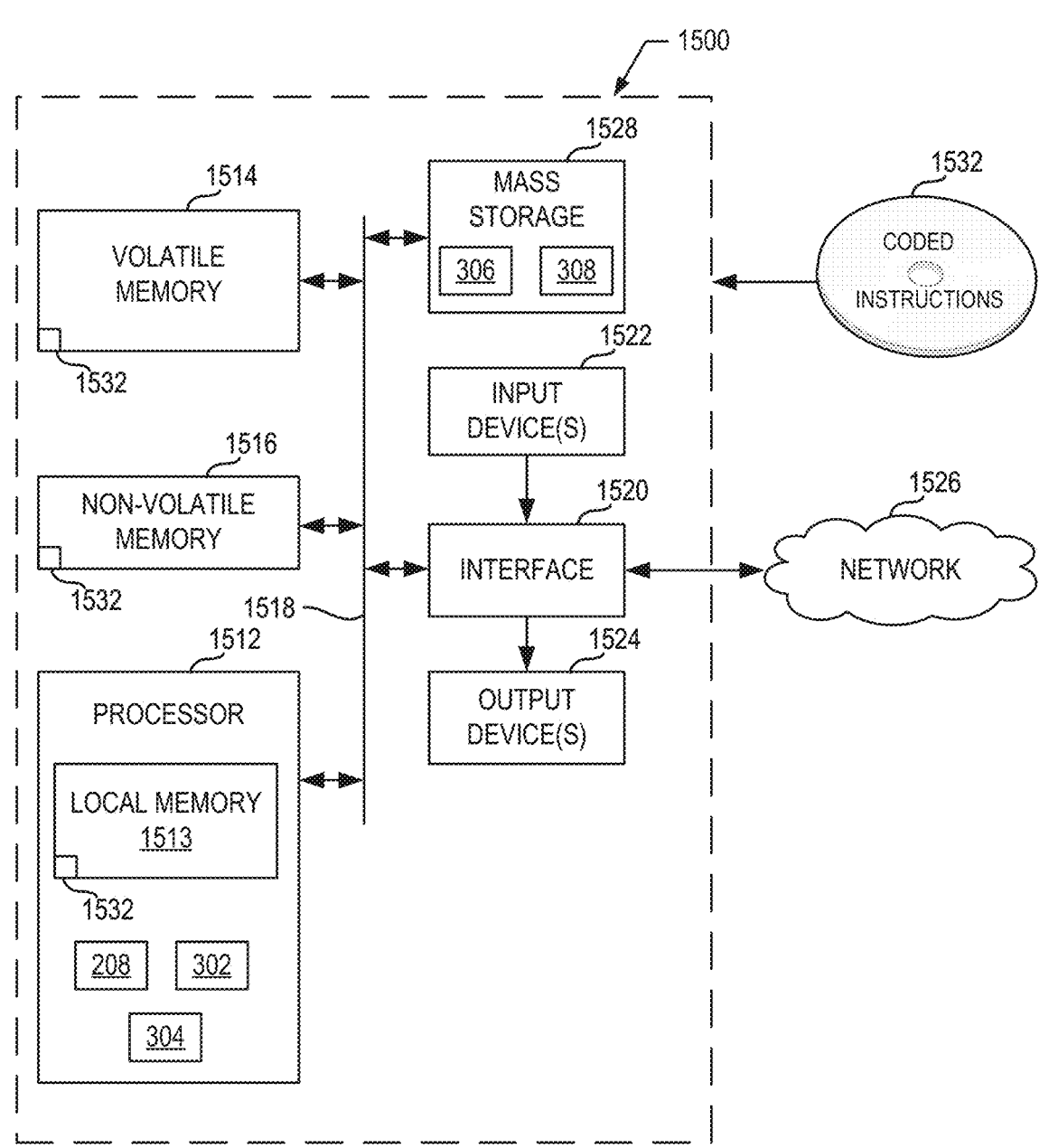
FIG. 15 is a block diagram of an example processing platform structured to execute the instructions of FIG. 11 to implement the meter data analyzer of FIGS. 1 and/or 5.

FIG. 15 is a block diagram of an example processor platform 1500 structured to execute the instructions of FIG. 11 to implement the meter data analyzer 112 of FIG. 5. The processor platform 1500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example media rate detector 208, the example data accessor 302, and the example signature matcher 304.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit

1520 may be implemented by any type of interface standard, such as an Ethernet interface, a universal serial bus (USB), a Bluetooth® interface, a near field communication (NFC) interface, and/or a PCI express interface.

In the illustrated example, one or more input devices 1522 are connected to the interface circuit 1520. The input device(s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives.

The machine executable instructions 1532 of FIG. 11 may be stored in the mass storage device 1528, in the volatile memory 1514, in the non-volatile memory 1516, and/or on a removable non-transitory computer readable storage medium such as a CD or DVD.

Figure 16:
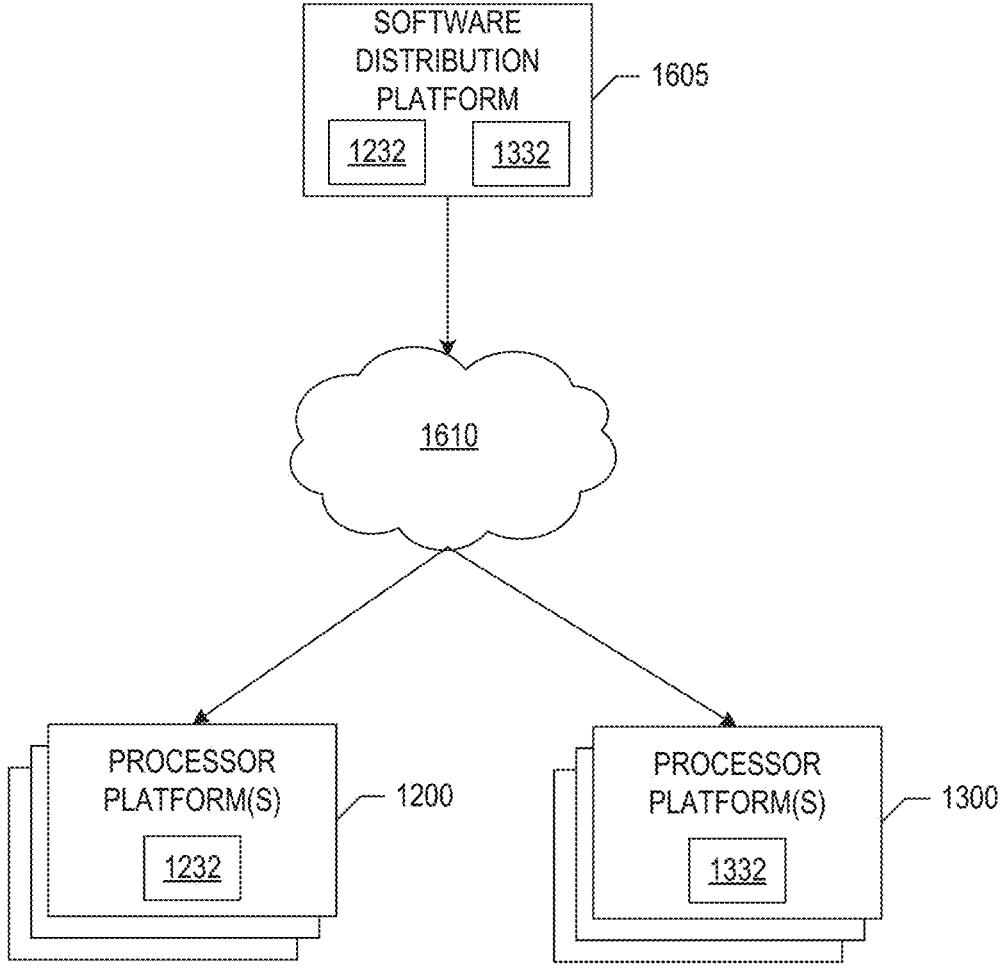
FIG. 16 is a block diagram of an example software distribution platform to distribute software (e.g., software corresponding to the example computer readable instructions of FIGS. 8-9) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1605 to distribute software such as the example computer readable instructions 1232 of FIG. 12 and/or the example computer readable instructions 1332 of FIG. 13 to third parties is illustrated in FIG. 16. The example software distribution platform 1605 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1232 of FIG. 12 and/or the example computer readable instructions 1332 of FIG. 13. The third parties may be consumers, users, retailers, OEMs, etc., who purchase and/or license the software for use and/or re-sale and/or sub-licensing. In the illustrated example, the software distribution platform 1605 includes one or more servers and one or more storage devices. The storage devices store the computer readable instructions 1232, 1332, which may correspond to the example computer readable instructions 800, 900 of FIGS. 8-9, as described above. The one or more servers of the example software distribution platform 1605 are in communication with a network 1610, which may correspond to any one or more of the Internet and/or any of the example networks 1226, 1326 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the example computer readable instructions 1232 of FIG. 12 and/or the example computer readable instructions 1332 of FIG. 13 from the software distribution platform 1605. For example, the software, which may correspond to the example computer readable instructions 800 of FIG. 8, may be downloaded to the example processor platform 1200, which is to execute the computer readable instructions 1232 to implement the meter 104 of FIG. 2. For example, the software, which may correspond to the example computer readable instructions 900 of FIG. 9, may be downloaded to the example processor platforms 1300, which is to execute the computer readable instructions 1332 to implement the meter data analyzer 112 of FIG. 3. In some example, one or more servers of the software distribution platform 1605 periodically offer, transmit, and/or force updates to the software (e.g., the example computer readable instructions 1232 of FIG. 12 and/or the example computer readable instructions 1332 of FIG. 13) to ensure improvements, patches, updates, etc. are distributed and applied to the software at the end user devices.

Figure 17:
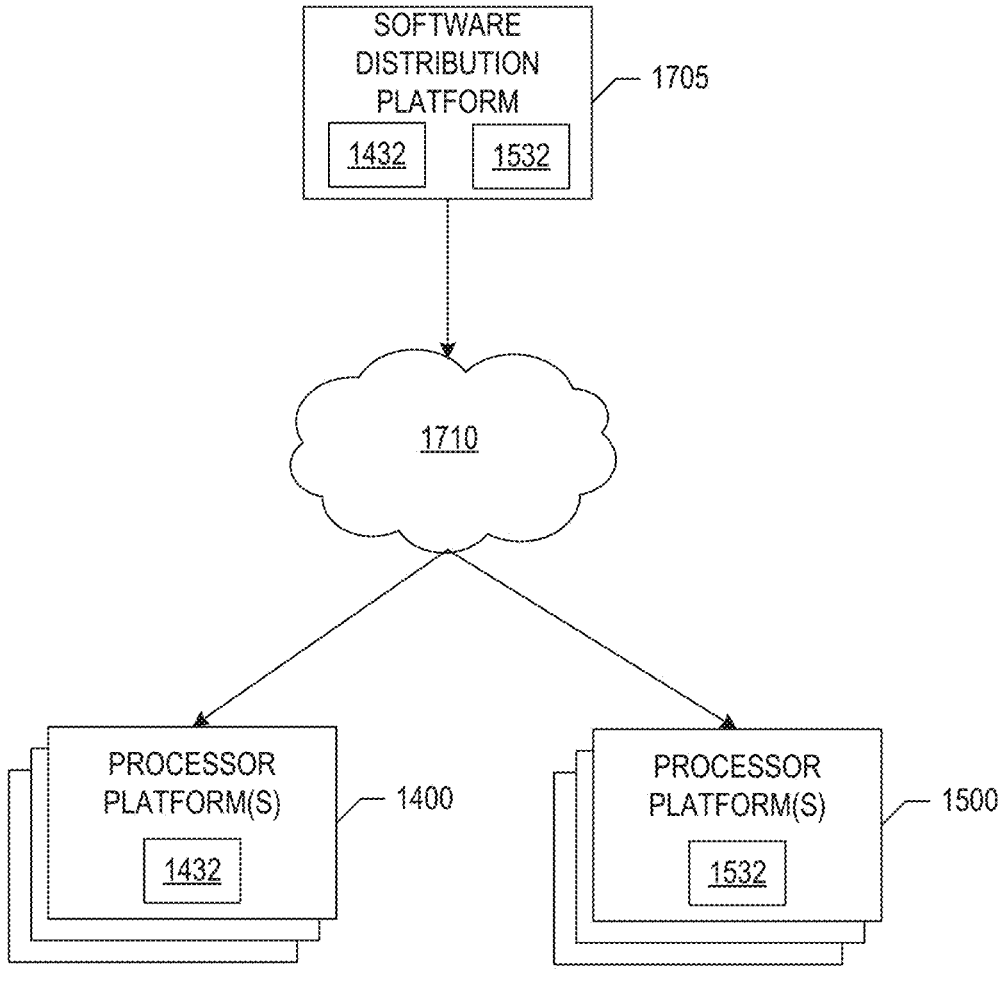
FIG. 17 is a block diagram of an example software distribution platform to distribute software (e.g., software corresponding to the example computer readable instructions of FIGS. 10-11) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1705 to distribute software such as the example computer readable instructions 1432 of FIG. 14 and/or the example computer readable instructions 1532 of FIG. 15 to third parties is illustrated in FIG. 17. The example software distribution platform 1705 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1432 of FIG. 14 and/or the example computer readable instructions 1532 of FIG. 15. The third parties may be consumers, users, retailers, OEMs, etc., who purchase and/or license the software for use and/or re-sale and/or sub-licensing. In the illustrated example, the software distribution platform 1705 includes one or more servers and one or more storage devices. The storage devices store the computer readable instructions 1432, 1532, which may correspond to the example computer readable instructions 1000, 1100 of FIGS. 10-11, as described above. The one or more servers of the example software distribution platform 1705 are in communication with a network 1710, which may correspond to any one or more of the Internet and/or any of the example networks 1426, 1526 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the example computer readable instructions 1432 of FIG. 14 and/or the example computer readable instructions 1532 of FIG. 15 from the software distribution platform 1705. For example, the software, which may correspond to the example computer readable instructions 1000 of FIG. 10, may be downloaded to the example processor platform 1400, which is to execute the computer readable instructions 1432 to implement the meter 104 of FIG. 4. For example, the software, which may correspond to the example computer readable instructions 1100 of FIG. 11, may be downloaded to the example processor platforms 1500, which is to execute the computer readable instructions 1532 to implement the meter data analyzer 112 of FIG. 5. In some example, one or more servers of the software distribution platform 1705 periodically offer, transmit, and/or force updates to the software (e.g., the example computer readable instructions 1432 of FIG. 14 and/or the example computer readable instructions 1532 of FIG. 15) to ensure improvements, patches, updates, etc. are distributed and applied to the software at the end user devices.

From the foregoing, it will be appreciated that example methods, apparatus and articles of manufacture have been disclosed that allow for reference signature matching. Example disclosed methods, apparatus and articles of manufacture improve the efficiency of using a computing device by reducing computational and storage requirements of systems that identify media using signatures. For example, disclosed examples prevent incorrect crediting and storage of signatures corresponding to the same media asset with different presentation rates, which enables broader, more accurate crediting of media. The disclosed methods, apparatus and articles of manufacture are accordingly directed to one or more improvement(s) in the functioning of a computer.

Example methods, apparatus, systems, and articles of manufacture to credit media based on presentation rate are disclosed herein. Further examples and combinations thereof include the following:

Example 1 includes an apparatus comprising memory, instructions, and at least one processor to execute the instructions to cause the at least one processor to at least detect a first peak in a first frequency range of audio data associated with monitored media, detect a second peak in a second frequency range of the audio data, the second frequency range different from the first frequency range, detect that a presentation rate of the monitored media is increased relative to a reference version of the media in response to the second peak being greater than the first peak, generate a signature corresponding to the monitored media, and transmit the signature to a media monitoring entity to credit the monitored media based on the presentation rate.

Example 2 includes the apparatus of example 1, wherein the at least one processor is to perform a Fourier transform on the audio data to determine a frequency spectrum, and process the frequency spectrum to detect the first peak and the second peak.

Example 3 includes the apparatus of example 1, wherein the audio data has a duration.

Example 4 includes the apparatus of example 3, wherein the duration is six seconds.

Example 5 includes the apparatus of example 1, wherein the at least one processor is to detect the presentation rate of the monitored media is an original presentation rate of the reference version of the media in response to the first peak being greater than the second peak.

Example 6 includes the apparatus of example 1, wherein the at least one processor is to flag the signature as having an increased presentation rate.

Example 7 includes the apparatus of example 1, wherein the second frequency range is greater than the first frequency range.

Example 8 includes a non-transitory computer readable medium comprising instructions which, when executed, cause a machine to at least detect a first peak in a first frequency range of audio data associated with monitored media, detect a second peak in a second frequency range of the audio data, the second frequency range different from the first frequency range, detect that a presentation rate of the monitored media is increased relative to a reference version of the media in response to the second peak being greater than the first peak, generate a signature corresponding to the monitored media, and transmit the signature to a media monitoring entity to credit the monitored media based on the presentation rate.

Example 9 includes the non-transitory computer readable medium of example 8, wherein the instructions cause the machine to perform a Fourier transform on the audio data to determine a frequency spectrum, and process the frequency spectrum to detect the first peak and the second peak.

Example 10 includes the non-transitory computer readable medium of example 8, wherein the audio data has a duration.

Example 11 includes the non-transitory computer readable medium of example 10, wherein the duration is six seconds.

Example 12 includes the non-transitory computer readable medium of example 8, wherein the instructions cause the machine to detect the presentation rate of the monitored media is an original presentation rate of the reference version of the media in response to the first peak being greater than the second peak.

Example 13 includes the non-transitory computer readable medium of example 8, wherein the instructions cause the machine to flag the signature as having an increased presentation rate.

Example 14 includes the non-transitory computer readable medium of example 8, wherein the second frequency range is greater than the first frequency range.

Example 15 includes a method comprising detecting a first peak in a first frequency range of audio data associated with monitored media, detecting a second peak in a second frequency range of the audio data, the second frequency range different from the first frequency range, detecting a presentation rate of the monitored media is increased relative to a reference version of the media in response to the second peak being greater than the first peak, generating a signature corresponding to the monitored media, and transmitting the signature to a media monitoring entity to credit the monitored media based on the presentation rate.

Example 16 includes the method of example 15, further including performing a Fourier transform on the audio data to determine a frequency spectrum, and processing the frequency spectrum to detect the first peak and the second peak.

Example 17 includes the method of example 15, wherein the audio data has a duration.

Example 18 includes the method of example 17, wherein the duration is six seconds.

Example 19 includes the method of example 15, further including detecting the presentation rate of the monitored media is an original presentation rate of the reference version of the media in response to the first peak being greater than the second peak.

Example 20 includes the method of example 15, further including flagging the signature as having an increased presentation rate.

Example 21 includes the method of example 15, wherein the second frequency range is greater than the first frequency range.

Example 22 includes an apparatus comprising a peak detector to detect (1) a first peak in a first frequency range of audio data associated with monitored media, and (2) a second peak in a second frequency range of the audio data, the second frequency range different from the first frequency range, a media rate detector to detect that a presentation rate of the monitored media is increased relative to a reference version of the media in response to the second peak being greater than the first peak, and a signature generator to generate a signature corresponding to the monitored media, and transmit the signature to a media monitoring entity to credit the monitored media based on the presentation rate.

Example 23 includes the apparatus of example 22, further including a frequency transformer to perform a Fourier transform on the audio data to determine a frequency spectrum, wherein the peak detector is to process the frequency spectrum to detect the first peak and the second peak.

Example 24 includes the apparatus of example 22, wherein the audio data has a duration.

Example 25 includes the apparatus of example 24, wherein the duration is six seconds.

Example 26 includes the apparatus of example 22, wherein the media rate detector is to detect the presentation rate of the monitored media is an original presentation rate of the reference version of the media in response to the first peak being greater than the second peak.

Example 27 includes the apparatus of example 22, wherein the media rate detector is to flag the signature as having an increased presentation rate.

Example 28 includes the apparatus of example 22, wherein the second frequency range is greater than the first frequency range.

Example 29 includes an apparatus comprising means for detecting peaks to detect a first peak in a first frequency range of audio data associated with monitored media, and detect a second peak in a second frequency range of the audio data, the second frequency range different from the first frequency range, means for detecting a presentation rate of the monitored media is increased relative to a reference version of the media in response to the second peak being greater than the first peak, and means for generating signatures to generate a signature corresponding to the monitored media, and transmit the signature to a media monitoring entity to credit the monitored media based on the presentation rate.

Example 30 includes the apparatus of example 29, further including means for transforming frequencies to perform a Fourier transform on the audio data to determine a frequency spectrum, wherein the means for detecting peaks is to process the frequency spectrum to detect the first peak and the second peak.

Example 31 includes the apparatus of example 29, wherein the audio data has a duration.

Example 32 includes the apparatus of example 31, wherein the duration is six seconds.

Example 33 includes the apparatus of example 29, wherein the means for detecting the presentation rate is to detect the presentation rate of the monitored media is an original presentation rate of the reference version of the media in response to the first peak being greater than the second peak.

Example 34 includes the apparatus of example 29, wherein the means for generating signatures is to flag the signature as having an increased presentation rate.

Example 35 includes the apparatus of example 29, wherein the second frequency range is greater than the first frequency range.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A method comprising:
obtaining, from a meter, peak data and a signature,
    wherein the peak data and the signature are both generated by the meter from audio data, and
    wherein the audio data corresponds to output of a media presentation on a media device;
determining, based on the peak data, that a presentation rate of the media presentation is different from an original presentation rate,
    wherein the presentation rate is indicative of a speed at which the media presentation was presented on the media device; and
flagging, based on the determining that the presentation rate of the media presentation is different from the original presentation rate, the signature.

2. The method of claim 1, further comprising:
comparing the signature to an adjusted audio reference signature from a database comprising a plurality of adjusted audio reference signatures.

3. The method of claim 1, wherein the presentation rate is faster relative to the original presentation rate, and wherein the original presentation rate is indicative of a speed at which the media presentation was developed for presentation.

4. The method of claim 1, wherein the flagging, based on the determining that the presentation rate of the media presentation is different from the original presentation rate, the signature comprises including an indicator with the signature.

5. The method of claim 1, further comprising:
comparing, based on the presentation rate being different than the original presentation rate, the signature to a reference signature;
identifying, based on a comparison of the signature to the reference signature, the media presentation; and
crediting the media presentation.

6. The method of claim 1,
wherein the determining, based on the peak data, that the presentation rate of the media presentation is different from the original presentation rate, comprises:
determining that a first peak in a first frequency range of the audio data associated with the media presentation is less than
a second peak in a second frequency range of the audio data, wherein the second frequency range is different from the first frequency range.

7. The method of claim 6, wherein the peak data comprises the first peak in the first frequency range of the audio data from the media presentation and the second peak in the second frequency range of the audio data.

8. A non-transitory computer-readable storage medium, having stored thereon program instructions that, upon execution by a processor, cause performance of a set of operations comprising:

obtaining, from a meter, peak data and a signature,
wherein the peak data and the signature are both generated by the meter from audio data, and
wherein the audio data corresponds to output of a media presentation on a media device;

determining, based on the peak data, that a presentation rate of the media presentation is different from an original presentation rate,
wherein the presentation rate is indicative of a speed at which the media presentation was presented on the media device; and flagging, based on the determining that the presentation rate of the media presentation is different from the original presentation rate, the signature.

9. The non-transitory computer-readable storage medium of claim 8, wherein the determining, based on the peak data, that the presentation rate of the media presentation is different from the original presentation rate comprises determining that a first peak in a first frequency range of the audio data associated with the media presentation is less than a second peak in a second frequency range of the audio data, wherein the second frequency range is different from the first frequency range.

10. The non-transitory computer-readable storage medium of claim 8, wherein the presentation rate is faster relative to the original presentation rate.

11. The non-transitory computer-readable storage medium of claim 8, wherein the flagging, based on the determining that the presentation rate of the media presentation is different from the original presentation rate, the signature comprises including an indicator with the signature.

12. The non-transitory computer-readable storage medium of claim 8, the set of operations further comprising:

comparing, based on the presentation rate being different than the original presentation rate, the signature to a reference signature;

identifying, based on a comparison of the signature to the reference signature, the media presentation; and
crediting the media presentation.

13. The non-transitory computer-readable storage medium of claim 8, the set of operations further comprising:

comparing, based on the flagging, the signature to a reference signature.

14. The non-transitory computer-readable storage medium of claim 13, wherein the comparing, based on the flagging, the signature to the reference signature comprises comparing the signature with a plurality of reference signatures, including the reference signature, from an adjusted audio reference database; and wherein the plurality of reference signatures in the adjusted audio reference database comprise presentation rates different than the original presentation rate.

15. The non-transitory computer-readable storage medium of claim 14, wherein the peak data comprises a first peak in a first frequency range of the audio data from the media presentation; and a second peak in a second frequency range of the audio data, wherein the second frequency range is different from the first frequency range.

16. A computing system comprising:

a processor; and a non-transitory computer-readable storage medium, having stored thereon program instructions that, upon execution by the processor, cause performance of a set of operations comprising:

receiving, from a meter, peak data and a signature,
wherein the peak data and the signature are both generated by the meter from audio data, and
wherein the audio data corresponds to output of a media presentation on a media device;

determining, using the peak data, a presentation rate of the media presentation is different than an original presentation rate,
wherein the presentation rate is indicative of a speed at which the media presentation was presented on a media device;

comparing, based on the presentation rate being different than the original presentation rate, the signature to a reference signature, identifying, based on a comparison of the signature to the reference signature, the media presentation; and crediting the media presentation.

17. The computing system of claim 16, wherein the comparing, based on the presentation rate being different than the original presentation rate, the signature to the reference signature comprises comparing the signature with a plurality of reference signatures, including the reference signature, from an adjusted audio reference database;

and wherein the plurality of reference signatures in the adjusted audio reference database comprise presentation rates different than the original presentation rate.

18. The computing system of claim 16, wherein the peak data comprises a first peak in a first frequency range of the audio data from the media presentation; and a second peak in a second frequency range of the audio data, wherein the second frequency range is different from the first frequency range.

19. The computing system of claim 16, wherein the presentation rate is faster relative to the original presentation rate.

20. The computing system of claim 19, wherein the comparing, based on the presentation rate being different than the original presentation rate, the signature to the reference signature comprises changing a signature search algorithm based on the presentation rate being faster than the original presentation rate.

* * * * *